(12) United States Patent
Burri et al.

(10) Patent No.: US 7,800,529 B2
(45) Date of Patent: Sep. 21, 2010

(54) METHOD AND APPARATUS FOR CREATING AND PROCESSING UNIVERSAL RADAR WAVEFORMS

(75) Inventors: Jeremy Francis Burri, Encino, CA (US); Michael Howard Farris, Thousand Oaks, CA (US); Matthew Michael Pohlman, Moorpark, CA (US); Randall Edward Potter, Northridge, CA (US)

(73) Assignee: Areté Associates, Northridge, CA (US)

( * ) Notice: Subject to any disclaimer, the term of this patent is extended or adjusted under 35 U.S.C. 154(b) by 43 days.

(21) Appl. No.: 12/026,508

(22) Filed: Feb. 5, 2008

(65) Prior Publication Data

US 2009/0195442 A1   Aug. 6, 2009

(51) Int. Cl.
*G01S 13/00* (2006.01)
(52) U.S. Cl. .................. 342/194; 342/196; 342/202; 342/204
(58) Field of Classification Search .................. 342/174
See application file for complete search history.

(56) References Cited

U.S. PATENT DOCUMENTS

| | | | |
|---|---|---|---|
| 5,233,356 A | * | 8/1993 | Lee et al. .................. 342/368 |
| 5,486,830 A | * | 1/1996 | Axline et al. .................. 342/43 |
| 2002/0128039 A1 | * | 9/2002 | Finn .................. 455/556 |
| 2003/0179136 A1 | * | 9/2003 | Kohno et al. .................. 342/360 |
| 2004/0061639 A1 | * | 4/2004 | Voigtlaender et al. .................. 342/70 |
| 2005/0179582 A1 | * | 8/2005 | Woodington et al. .................. 342/70 |
| 2006/0125682 A1 | * | 6/2006 | Kelly et al. .................. 342/159 |
| 2006/0227042 A1 | * | 10/2006 | Budic .................. 342/195 |
| 2006/0279452 A1 | * | 12/2006 | Thomas et al. .................. 342/68 |
| 2007/0165488 A1 | * | 7/2007 | Wildey .................. 367/101 |
| 2007/0264945 A1 | * | 11/2007 | Carrez .................. 455/118 |

\* cited by examiner

*Primary Examiner*—Thomas H Tarcza
*Assistant Examiner*—Timothy A Brainard
(74) *Attorney, Agent, or Firm*—McDermott Will & Emery LLP

(57) ABSTRACT

A new approach to radar imaging is described herein, in which radar pulses are transmitted with an uneven sampling scheme and subsequently processed with novel algorithms to produce images of equivalent resolution and quality as standard images produced using standard synthetic aperture radar (SAR) waveform and processing techniques. The radar data collected with these waveforms can be used to create many other useful products such as moving target indication (MTI) and high resolution terrain information (HRTI). The waveform and the correction algorithms described herein allow the algorithms of these other radar products to take advantage of the quality Doppler resolution.

49 Claims, 21 Drawing Sheets

If p = 1 mod 4, w(0)=0
If p = 3 mod 4, w(0)=1

| p | w(i) |
|---|---|
| 3 | 110 |
| 5 | 01001 |
| 7 | 11101 00 |
| 11 | 11011 10001 0 |
| 13 | 01011 00001 101 |
| 17 | 01101 00011 00010 11 |
| 19 | 11001 11101 01000 0110 |
| 23 | 11111 01011 00110 01010 000 |
| 29 | 01001 11101 00010 01000 10111 1001 |
| 31 | 11101 10111 10001 01011 10000 10010 0 |
| 37 | 01011 00101 11100 01000 01000 11110 10011 01 |
| 41 | 01101 10011 10000 01010 11010 10000 01110 01101 1 |

METHOD AND APPARATUS FOR CREATING AND PROCESSING UNIVERSAL RADAR WAVEFORMS

BACKGROUND

1. Field

The present disclosed embodiments relates generally to radar image processing, and more specifically to a method and apparatus for creating and processing universal radar waveforms.

2. Background

Radio detection and ranging (radar) technology uses the transmission and reception of pulsed electromagnetic waves to detect objects. In radar, an electromagnetic pulse is transmitted from a radar platform, and this transmitted pulse is scattered back to the radar platform by various objects. The roundtrip time taken by the pulse to both travel from the radar platform to the scattering object and back therefrom is proportional to the distance between the radar platform and the object. The transmitted pulse is generally sent with a characteristic waveform such that the returned pulse will be scattered back with a shape resembling this transmitted waveform. Multiplying the returned energy by this waveform allows the returns to be sampled in time to yield a single complex number representation for the returned energy as a function of time—referred to as complex radar pulses. Since the complex radar pulses are a function of time and the distance is proportional to the roundtrip travel time of the pulses, these complex radar pulses can be thought of as samples of the objects present at various distances from the radar. This is how distance can be measured using a single radar pulse.

If two pulses are used, the line-of-sight motion of an object can also be determined. If the object is at a certain distance from the radar platform and is moving toward the radar platform, then the complex radar pulses will rotate in phase with a positive frequency. Similarly, if the object is moving away from the radar platform, then the complex radar pulses will rotate in phase with a negative frequency. This effect is referred to as the Doppler effect. If multiple pulses at a given distance are used in combination, multiple Doppler frequencies can be measured by decomposing the complex radar pulses into sine and cosine waves at these frequencies; the energies observed at these various frequencies is called the Doppler spectrum.

However, if the radar platform is moving, then returns that appear at various Doppler frequencies can be the result of multiple stationary objects located at various different positions. For example, assume that a radar pulse is transmitted in a direction perpendicular to the motion of the radar itself and define the vector pointing from the radar to a stationary object that scatters back pulse energy as the pointing vector. If the pointing vector to this object is perpendicular to the direction of the radar motion, then the complex radar pulses for this object will appear at zero Doppler frequency. If, however, the pointing vector is positively aligned with the radar motion vector, then the complex radar pulses for this object will appear at a positive Doppler frequency proportional to the apparent line-of-sight motion of the object relative to the radar platform.

This separation of stationary objects within a Doppler spectrum obtained from a moving radar platform has many different applications. For example, it is the foundation of what is called synthetic aperture radar (SAR) imaging. While the problems discussed herein are not limited to SAR imaging applications, SAR images provide an illustrative example useful for describing deficiencies in the prior art. Those skilled in the art will recognize that the problems addressed herein apply more globally to radar returns and the processing thereof, and are not limited to their use in SAR images, which is only one example.

In SAR imaging, images are produced by post-processing a series of complex radar pulses from a moving radar platform. In this imaging method, the Doppler resolution of a radar image (which relates to the distance between objects perpendicular to the radar line-of-sight, or distance in the cross-range direction) is inversely proportional to the length of the temporal aperture over which the Doppler decomposition is performed (this decomposition is also referred to as coherent integration). Increasing the time over which coherent integration is performed provides finer cross-range resolution, which is a desirable quantity for SAR imagery.

Although SAR imaging provides many advantages, multiple intelligence, surveillance and reconnaissance (ISR) missions require different collection modes that may be mutually incompatible. For example, a common type of ISR mission for which SAR radar platforms are used is moving target indication (MTI) missions. MTI missions require many pulses per detection opportunity along with a narrow beam. In contrast, detailed imaging missions require the collection of continuous pulse streams using broad beams. As these modes are inherently incompatible, generally no MTI information is available during image mode collection and vice versa.

One approach that may be taken to address the incompatible modes of operation under which the radar platform is required to collect data is to have the radar platform transmit pulses for both modes over the same time period. However, assuming that a fixed number of samples may be transmitted and collected over the same time period, the radar resources collected over the same time period for each mode is effectively halved. Currently, this results in a dramatic, corresponding decrease in the quality of resulting SAR images.

In short, generating high quality SAR images using existing radar imaging schemes requires numerous radar resources. For example, existing radar imaging schemes are directed to using sampling patterns that allow for straightforward processing to generate the radar data output. While existing sampling patterns have known and straightforward processing techniques, they require a high number of pulses and a large amount of radar resources. Any reduction in the number of pulses will result in significant degradation in processed radar returns.

There is therefore a need in the art for a solution to reduce the use of radar resources while maintaining, the quality of processed radar returns.

SUMMARY

Techniques and approaches for processing radar returns from a reduced number of pulses are described herein. The processing provides images with essentially equivalent resultant resolution and quality as the images created using prior art schemes and sampling patterns.

In one approach, a method for processing a waveform is disclosed, the method including receiving a first data set having a plurality of values based on a radar waveform return. Then creating a second data set comprising the first data set minus at least one significant value from the first data set and its effects on other values within the first data set.

In another approach, the method includes receiving a first data set comprising a plurality of transformed values; identifying at least one peak value in the first data set; creating a peak correction function approximation using the at least one peak value; and, removing the peak correction function approximation from the first data set.

In yet another approach, a computer-program product including computer-readable medium having codes executable by at least one computer to implement a method for processing a waveform is disclosed. The computer-readable medium having code for receiving a first data set having a plurality of values based on a radar waveform return; and code for creating a second data set comprising the first data set minus at least one significant value from the first data set and its effects on other values within the first data set.

In yet another approach, a waveform generator for generating a plurality of pulses to be transmitted is disclosed. The waveform generator includes a processing system configured to generate a binary sequence representing a transmission of pulses from the plurality of pulses, wherein the binary sequence includes a sampling pattern of a fully transmitted stream of pulses having a first underlying pulse repetition frequency; and, a transmitter coupled to the processing system, the transmitter configured to transmit a coded sequence of pulses based on the binary sequence.

In yet another approach, a method for generating a plurality of pulses to be transmitted is disclosed. The method includes generating a binary sequence representing a transmission of pulses from the plurality of pulses, wherein the binary sequence includes a sampling pattern of a fully transmitted stream of pulses having a first underlying pulse repetition frequency; and, creating a coded sequence of pulses based on the binary sequence.

BRIEF DESCRIPTION OF THE DRAWINGS

FIG. 3 is a table of binary patterns of a first dozen linear quadratic residue (QR) patterns;

DETAILED DESCRIPTION

Figure 1:
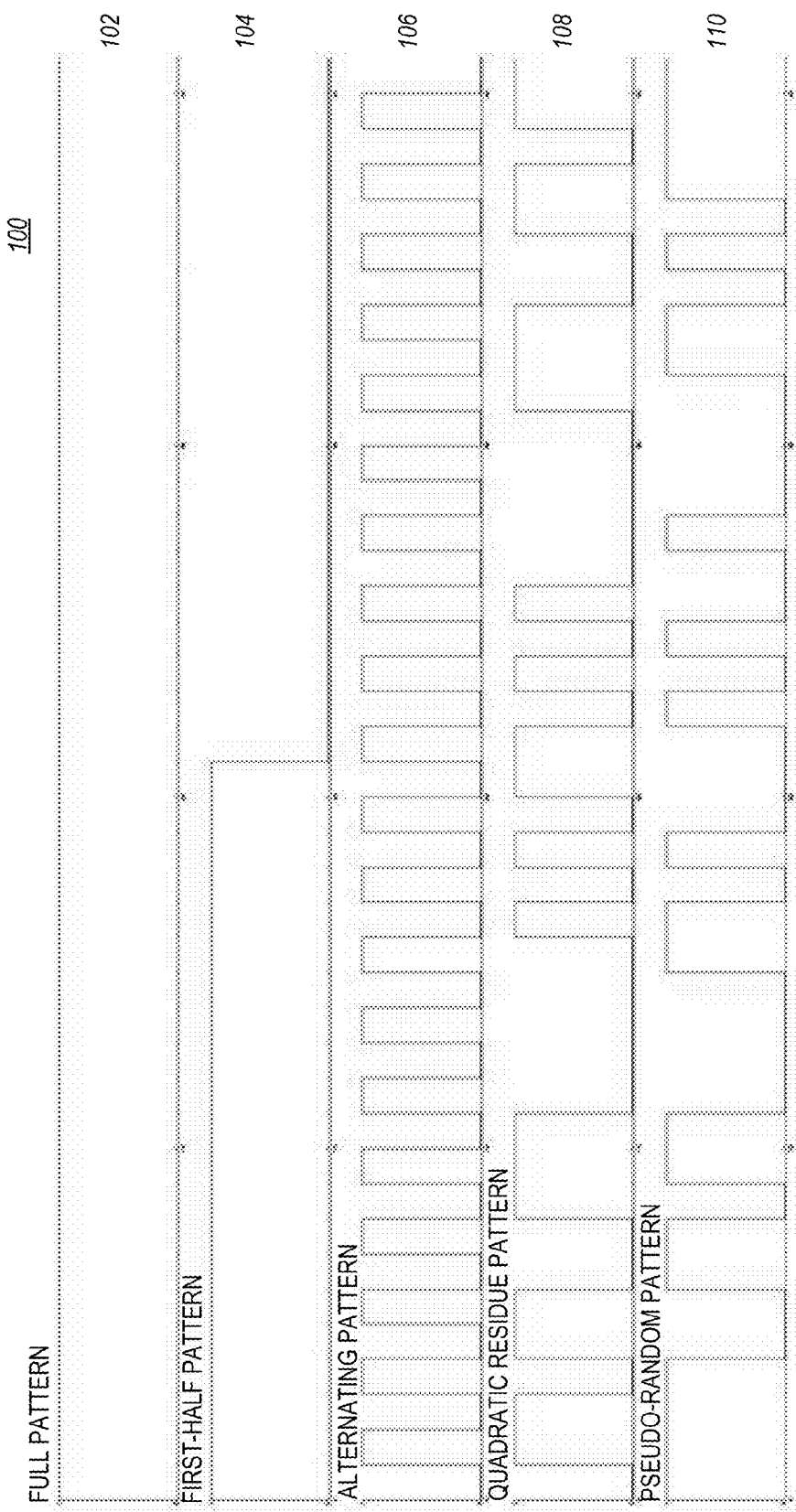
FIG. 1 contains a comparison of plots of various universal radar waveform (URW) sampling patterns of length 41, including a full pattern, a first-half pattern, an alternating pattern, a quadratic residue (QR) pattern and a pseudo-random pattern.

The word "exemplary" is used herein to mean "serving, as an example, instance, or illustration." Any embodiment described herein as "exemplary" is not necessarily to be construed as preferred or advantageous over other embodiments. In addition, the headings and sub-headings used herein are not to be taken as limiting in any sense and are used for ease of reference to the various parts of the document.

The techniques described herein use fewer radar resources while maintaining the quality of processed radar returns. SAR images will be used in a demonstrative fashion to help illustrate the inventions disclosed herein. However, the inventions are not limited to use with SAR images, and those skilled in the art will recognize their applicability to a wide range of radar applications. For example, the inventions described herein are applicable to applications such as moving target indication (MTI) and high resolution terrain information (HRTI).

With standard, evenly sampled SAR waveforms, image resolution becomes finer as the temporal aperture (i.e., the period of time during which the radar pulses are transmitted) used for coherent integration increases. In one approach, an uneven sampling waveform, coupled with appropriately tailored post-processing algorithms, is used to produce images of similar quality and fewer radar pulses over the same temporal aperture.

The pulse repetition frequency (PRF) of a radar waveform is equal to the number of pulses that are transmitted by the radar per second. The inverse of this baseline PRF is a time increment ($\Delta t$) that is the smallest time increment between pulses. A universal radar waveform (URW) is defined as a function of a radar waveform that transmits pulses at a baseline PRF. In one exemplary approach, the URW is constructed of a radar waveform that includes pulses transmitted at multiple PRFs, with each PRF being a multiple of the baseline PRF.

In one exemplary approach, the URW is defined in increments of $\Delta t$ (i.e., the inverse of the baseline PRF) such that the time separation between pulses is equal to integer multiples of Δt. For example, if a baseline PRF is 10 pulses/second, then a standard waveform over the course of 1 second would consist of 10 pulses, each separated in time by 0.1 seconds. Thus, in this approach, the URW may be defined by pulses that are separated by times that are multiples of 0.1 seconds (0.2, 0.4, 0.5, etc.). For example, a series of pulses that are transmitted over 1 second may be described as follows: Pulse 2 is transmitted 0.2 seconds after Pulse 1, Pulse 3 is transmitted 0.1 seconds after Pulse 2, Pulse 4 is transmitted 0.4 seconds after Pulse 3, and Pulse 5 is transmitted 0.2 seconds after Pulse 4.

A convenient representation of the URW is one where a binary string of ones and zeros represents when pulses have or have not been transmitted. For example, utilizing the 1 second example again, if a one ("1") represents that a pulse is transmitted at that integer multiple of Δt and a zero ("0") represents that a pulse is not transmitted at this time, the previous URW example can be represented by a 10 character binary string [1,0,1,1,0,0,0,1,0,1]. Similarly, a standard waveform transmitting 10 pulses, each separated by 0.1 seconds, can be represented as [1,1,1,1,1,1,1,1,1,1].

The definition for the URW is flexible and general in its application. For example, if the desired shortened separation between pulses is not an integer multiple of a predefined Δt, then the baseline PRF can be sufficiently increased (and thereby the Δt can be decreased) such that all time separations between pulses can be defined in terms of integer multiples of this new Δt. Conversely, the baseline PRF can be sufficiently decreased if a larger separation between pulses is desired. In this manner, the URW is a general representation of an unevenly pulsed waveform that can be defined in terms of a sparse, uneven sampling of a waveform with a baseline PRF.

This binary string representation can be thought of as a sampling pattern of the underlying baseline PRF. For example, the exemplary URW above (i.e., [1,0,1,1,0,0,0,1,0,1]) can be described as a sampling pattern of the same binary sequence multiplied by the baseline PRF representation, since [1,0,1,1,0,0,0,1,0,1]×[1,1,1,1,1,1,1,1,1,1]=[1,0,1,1,0,0,0,1,0,1]. Examples of various URW sampling patterns are shown in FIG. 1, which contain plots of the URW sampling patterns of length 41, respectively referred to as a full pattern (plot 102), a first-half pattern (plot 104), an alternating pattern (plot 106), a QR pattern (plot 108), and a pseudo-random pattern (plot 110).

In radar imaging, the frequency response of the URW pattern is very important. The URW representation described above allows the analysis of both the frequency response of the sampling pattern and how the sampling pattern affects the characteristics of the waveform itself. Since the URW is defined as a function of time (e.g., integer increments of Δt), a Fourier representation (decomposition in sine and cosine waves) shows how the URW is defined in frequency. Different radar applications may be optimized by ensuring or designing certain characteristics in the Fourier transform of the URW. With the inventive sampling and processing techniques disclosed herein, these characteristics may be selected and utilized without sacrificing operational efficiency or radar output qualities.

For SAR images, for example, the narrowness of the width of the main lobe of the URW frequency response corresponds to the radar imaging resolution, and the integrated sidelobe energy corresponds to blurring of the radar image. Therefore, the best qualitative sampling pattern for SAR applications has a frequency response with both a narrow main lobe and small sidelobes, though some tradeoffs between the two are inevitable. A narrow main lobe means that the bulk of the energy response occurs in a narrow frequency range; this indicates that the observed energy at a particular frequency generally occurs as the result of energy that is actually present at that frequency and no others. Flat sidelobes mean that frequencies other than that of the main lobe have low energy responses; this indicates that the observed energy at a particular frequency generally does not respond to frequencies other than the frequency of interest. In other words, having flat sidelobes means that the resultant sidelobe energy of the waveform frequency response is distributed as evenly as possible. This even distribution ensures that any single sidelobe peak is as low as possible relative to the main lobe peak. Flat sidelobes maximize the main lobe-to-maximum sidelobe energy ratio. Those skilled in the art will recognize and appreciate that other radar applications may have different desired optimal Fourier transform characteristics. Generally speaking, the sampling and processing techniques disclosed herein will allow for such characteristics to be chosen and applied for any given application, not limited to SAR imaging.

To provide further background to the use of URW, some details of sampling data using even and uneven sampling will be discussed.

Figure 2:
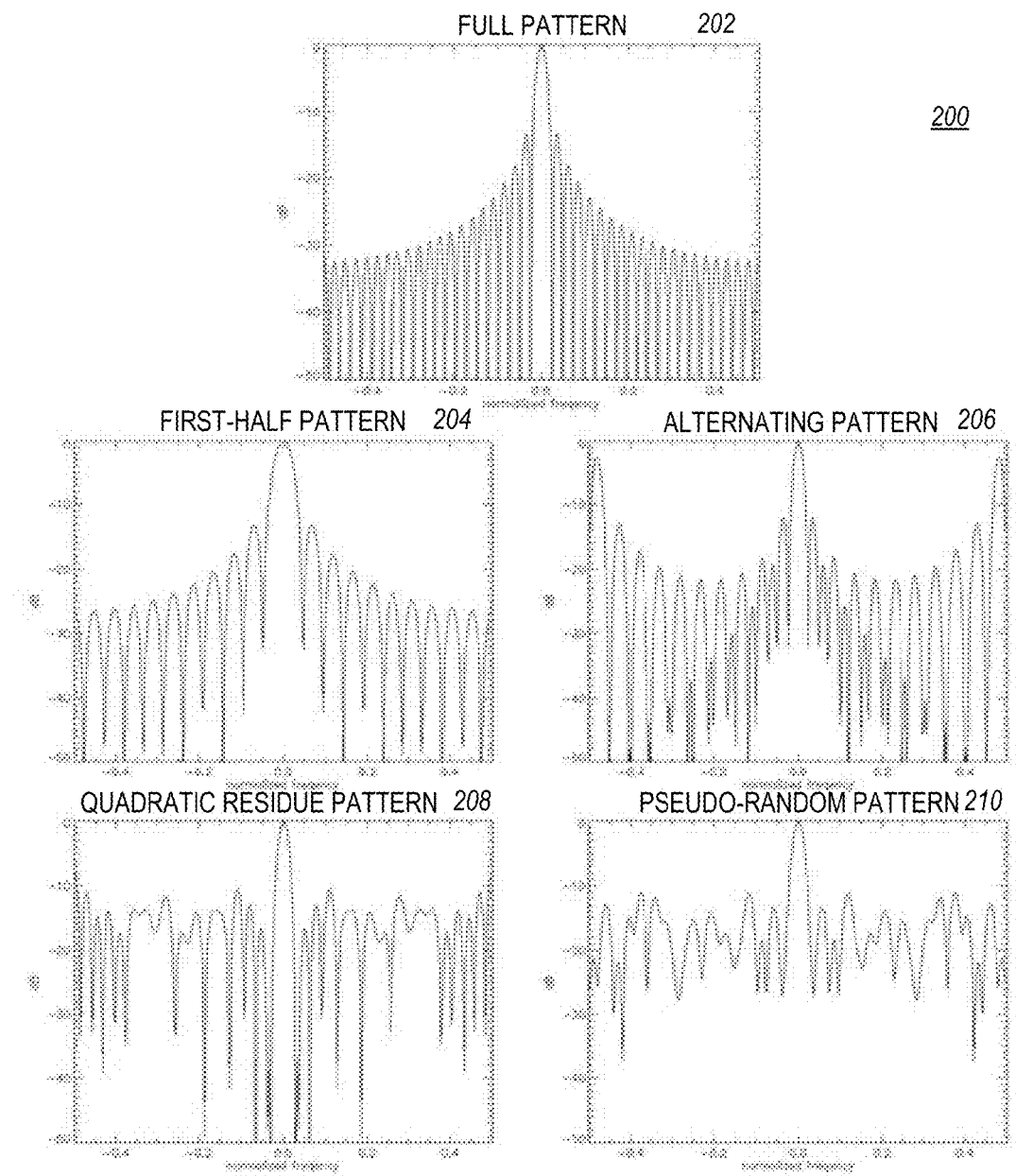
FIG. 2 contains a comparison of plots of the frequency response for the URW sampling patterns as shown in FIG. 1.

Two regular patterns (those whose sampling is more even or regular) using about half of the pulses of a full sampling pattern will be compared to the full sampling pattern: the first-half pattern and the alternating pattern. These patterns are shown visually in the first three plots of FIG. 1, and the frequency response of each can be seen in FIG. 2, which illustrates the frequency response interpolated by a factor of eight for the following URW sampling pattern of length 41 shown in FIG. 1: the full pattern 102 (plot 202), the first-half pattern 104 (plot 204), the alternating pattern 106 (plot 206), the QR pattern 108 (plot 208), and the pseudo-random pattern 110 (plot 210).

The main lobe width is twice as wide for the first-half pattern than for the full pattern, effectively making the SAR image resolution coarser by a factor of two. In addition, the sidelobes are wider by the same factor and pushed out in frequency by a factor of two, though they decay in much the same way as the full pattern. Similarly, just as a ½ sampling makes the image resolution more coarse by a factor of 2, a 1/n sampling pattern makes the image resolution more coarse by a factor of n.

The alternating pattern has a different frequency response. The main lobe width is the same as the fully filled case, and the first few sidelobes decay just as quickly. However, a significant difference occurs near frequencies that are one-half the PRF (also referred to as the Nyquist frequency), where a large sidelobe response is seen at these frequencies from the alternating pattern. Using every n-th sample not only has the same narrow main peak and large near Nyquist sidelobes, but other large sidelobes as well. Accordingly, reducing the sampling by 50% or more but retaining an even sampling pattern has the undesired effect of reducing the quality of radar output data (including but not limited to output data useful for generating SAR images).

The first of two types of uneven sampling patterns will now be described. As mentioned previously, one goal is to generate an equivalent quality SAR image using fewer radar pulses than standard methods. As shown above, some patterns using fewer pulses have frequency responses with a narrow main lobe, yet their sidelobes are high. Others have flatter sidelobes, yet their main lobe widths are wider. For the URW, a sampling pattern is sought that can provide a narrow main lobe and flat sidelobes in the same pattern.

In one approach, one set of sampling patterns that have these desired URW properties are those that implement a property of number theory referred to as the quadratic residue. For background, modular arithmetic uses only the numerical remainder that results when one integer is divided by another integer. For example, 15 mod 4 is notation that refers to the remainder that results front dividing the integer 15 by the integer 4. The integer 4 divides into 15 three times, which leaves a remainder of 3. Therefore 15 mod 4 is 3. A quadratic residue is then defined as follows. Let p be an odd prime number (or any prime number greater than 2). Further, an integer i is said to be a quadratic residue of p if and only if there exists an integer r, where 0<r<p and that $r^2$=i mod p.

For example, let 5 be the prime number of interest, p. Therefore, for r=[1,2,3,4], the squares of r ($r^2$=[1,4,9,16]) are divided by p and their respective remainders ([1 mod 5, 4 mod 5, 9 mod 5, 16 mod 5]=[1,4,4,1]) are found. Therefore, from this definition, the integers 1 and 4 are considered to be quadratic residues.

Additionally, quadratic residue patterns have interesting properties based upon the value of the prime number p. For odd prime numbers, these numbers can either be 1 mod 4 (where p mod 4=1 mod 4=1) or 3 mod 4 (where p mod 4=3 mod 4 =3). With these definitions, a URW sampling pattern can be established, with the URW sampling pattern based on quadratic residues being called herein quadratic residue pattern (or QR pattern) and is defined as follows. Let w(i) be the URW sampling pattern of length p (for which w has index values ranging from 0 to p−1). If p ≡1 mod 4, then w(0)=0, w(i)=1 if i is a quadratic residue of p, and w(i)=0 otherwise. If p≡3 mod 4, then w(0)=1, w(i)=1 if i is a quadratic residue of p, and w(i)=0 otherwise. FIG. 3 illustrates the binary patterns of a first dozen linear QR patterns.

Figure 4:
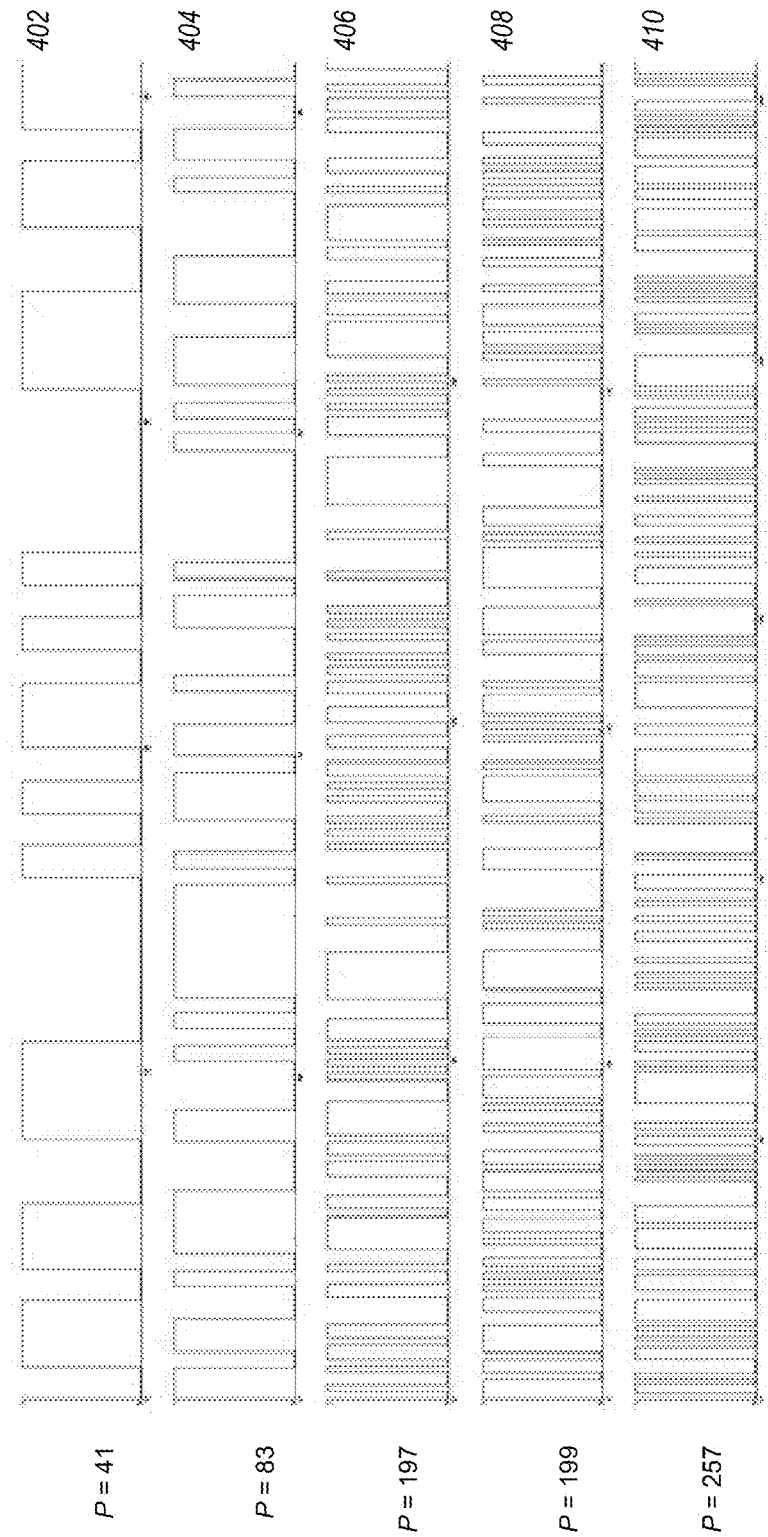
FIG. 4 contains comparison of plots of QR patterns, each of a particular sampling pattern length (p), including p=41, p=83, p=197, p=199 and p=257.
Figure 5:
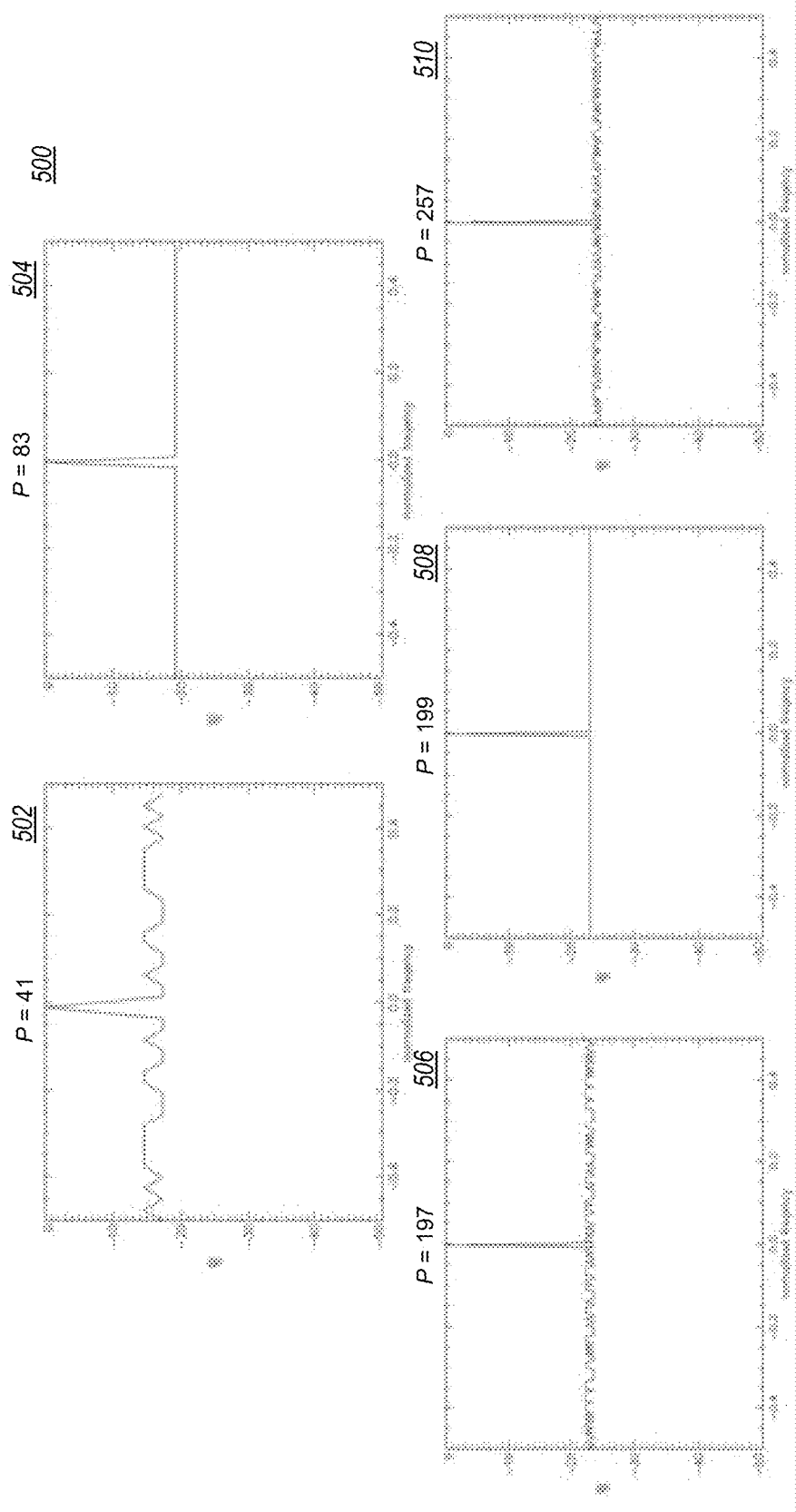
FIG. 5 contains a comparison of plots of frequency responses for the various lengths of QR patterns of FIG. 4.

As a property of quadratic residues from number theory, it can be shown that for any odd prime p, there are exactly (p−1)/2 integers that are quadratic residues of p, and therefore exactly (p−1)/2 integers that are not quadratic residues of p (zero is not defined to be either a quadratic residue or not a quadratic residue). Depending on the value of the pattern when i=0, this essentially partitions the sample space into two equal pieces. FIG. 4 compares plots of QR patterns for various lengths, including p=41 (plot 402), p=83 (plot 404), p=197 (plot 406), p=199 (plot 408) and p=257 (plot 410), and the plots of their respective discrete frequency responses are shown in FIG. 5, including p=41 (plot 502), p=83 (plot 504), p=197 (plot 506), p=199 (plot 508) and p=257 (plot 510).

Figure 6:
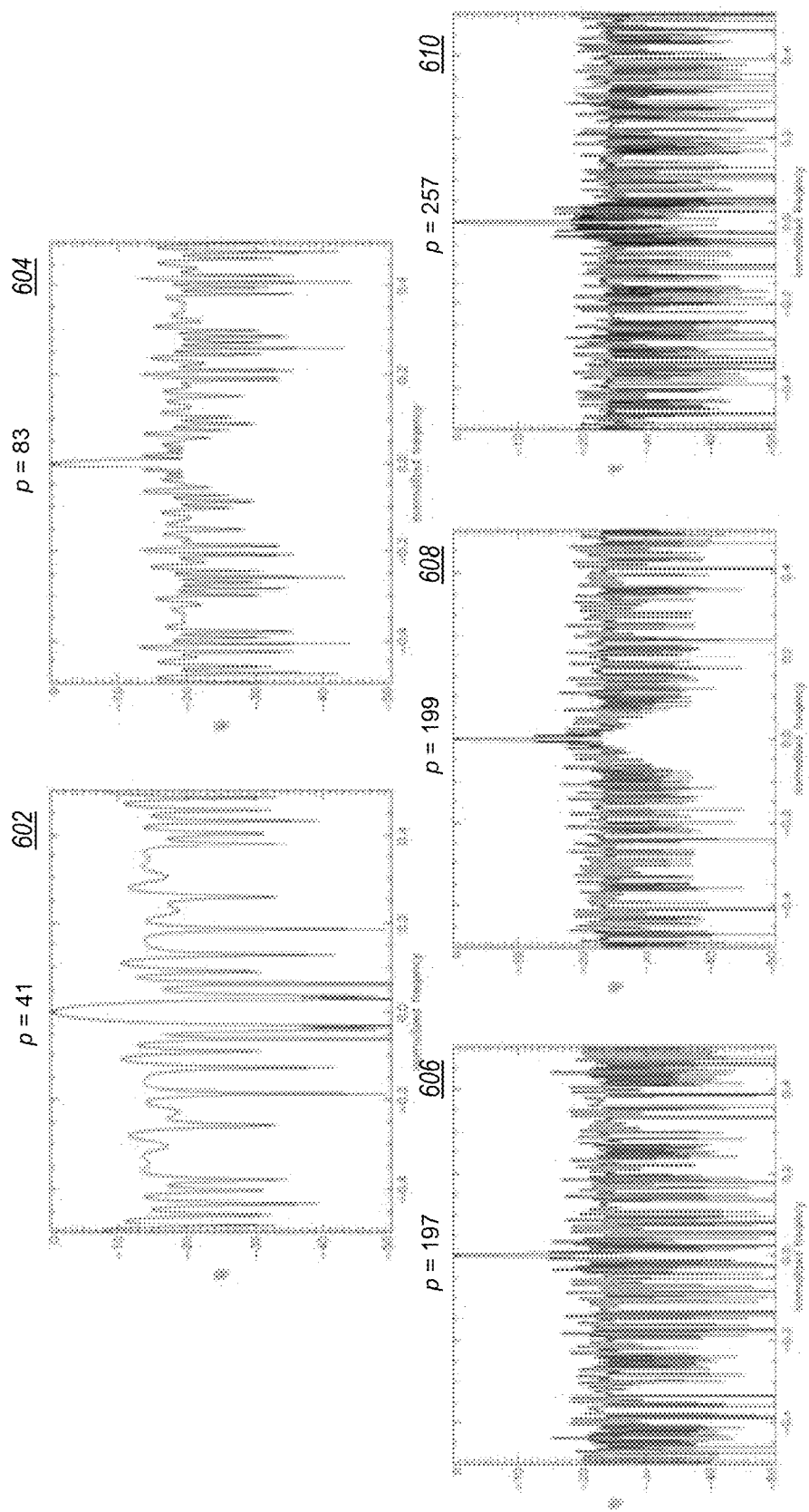
FIG. 6 contains a comparison of plots of interpolated frequency responses for the various lengths of QR patterns of FIG. 4.

One property of QR patterns that is beneficial for the URW is that QR patterns have nearly or identically equal sidelobes at discrete frequencies. Depending, on the value of p mod 4, the sidelobes are either nearly flat (p≡1 mod 4) or perfectly flat (p≡3 mod 4), as can be seen in FIG. 5. Though QR patterns of length p≡3 mod 4 are flat when sampled discretely, the plots of the oversampled frequency responses contained in FIG. 6, which contain plots of interpolated frequency responses for QR patterns of various lengths, including p=41 (plot 602), p=83 (plot 604), p=197 (plot 606), p=199 (plot 608) and p=257 (plot 610), illustrate that QR patterns of length p≡1 mod 4 also have relatively flat sidelobes.

Looking again at the frequency plots, the QR pattern seems to be the perfect balance between sidelobe level and main peak width. In fact, the description of the QR pattern above demonstrates that the main peak width is the same width as the full pattern, while the sidelobes are relatively flat.

Figure 7:
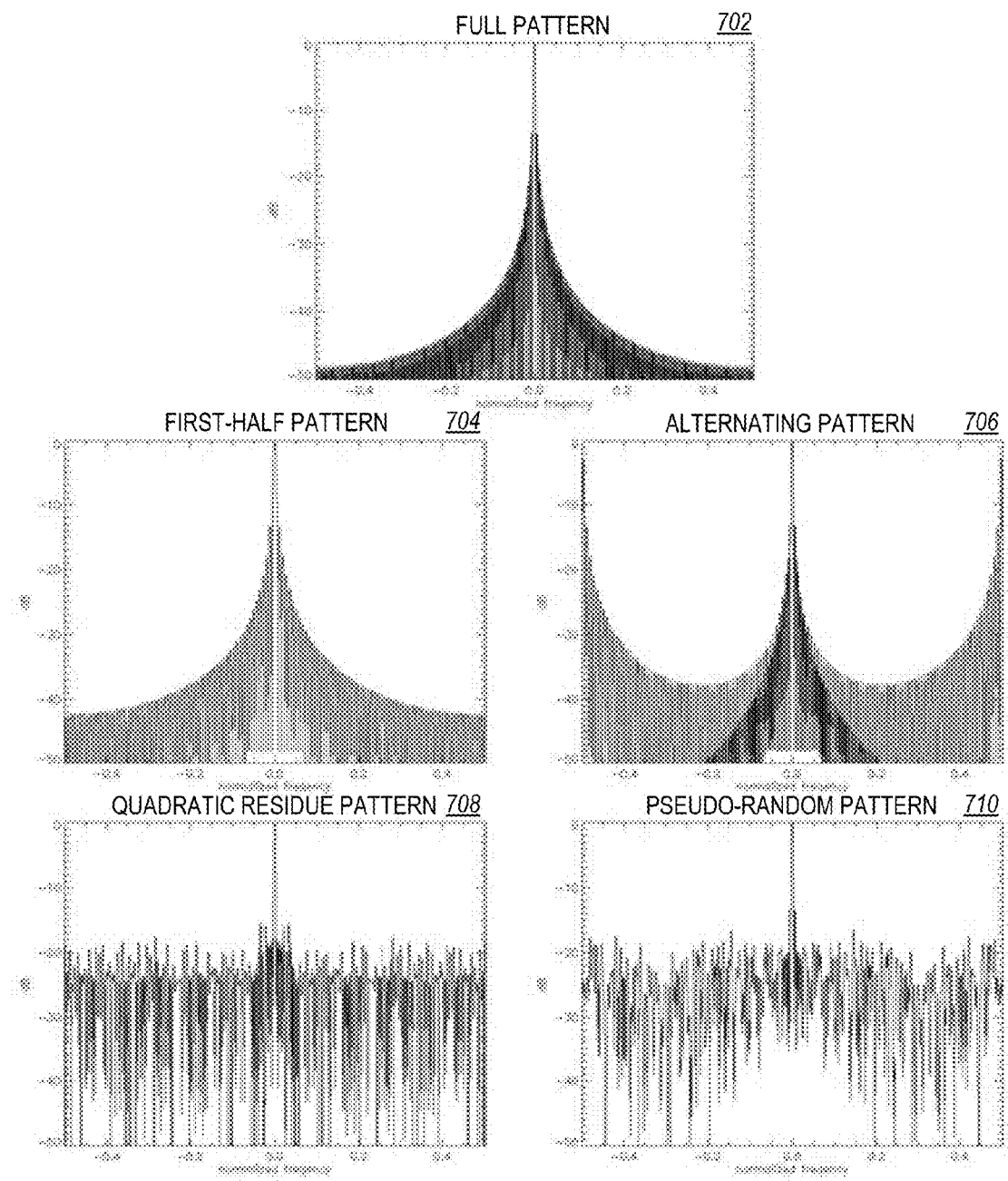
FIG. 7 contains a comparison of plots of interpolated frequency responses for various URW sampling patterns of length 257, including a full pattern, a first-half pattern, an alternating pattern, a QR pattern, and a pseudo-random pattern.

FIG. 7 contains plots of the interpolated frequency responses for the following sampling schemes of length 257: full pattern (plot 702), first-half pattern (plot 704), alternating pattern (plot 706), quadratic residue pattern (plot 708), and pseudo-random pattern (plot 710). FIG. 7 shows the full frequency range, while FIG. 8 contains close-up plots of the main peak and the first few sidelobes of the frequency response for the same sampling patterns of length 257: full pattern (plot 802), first-half pattern (plot 804), alternating pattern (plot 806), quadratic residue pattern (plot 808), and pseudo-random pattern (plot 810). The frequency response plots of the length 257 patterns in FIG. 7 can be compared to the length 41 patterns in FIG. 2.

Another consideration for uneven sampling comes from the idea of random or pseudo-random patterns covering the desired fraction of radar pulses. The frequency response of such patterns will usually have a narrow main peak width and low sidelobe levels. While these properties may not be achieved by all random patterns nor quite as well as the QR patterns, the flexibility of designing uneven sampling patterns of arbitrary length and fraction of pulses may make such patterns useful.

Figure 9:
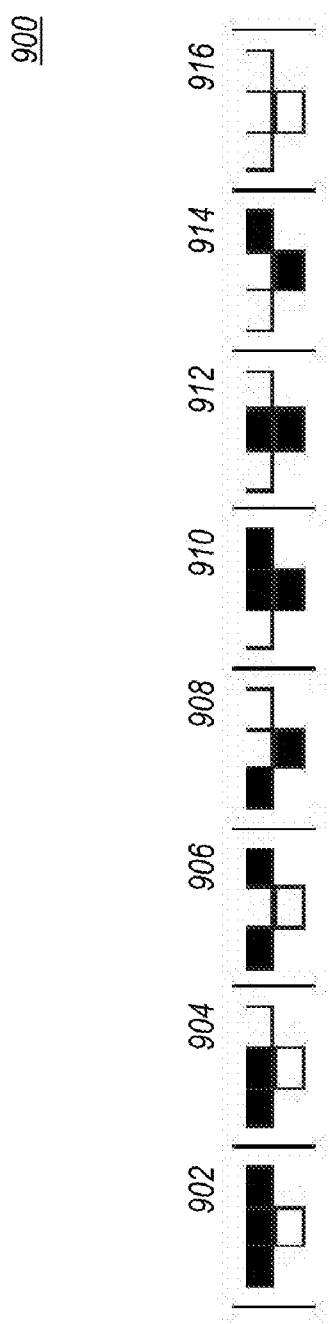
FIG. 9 is a plot of a Rule 30 update function for a cellular automaton-based pseudo-random number generator.

One approach for implementing a pseudo-random generator is a cellular automaton-based generator. A cellular automaton is a rules-based computational network comprised of connected elements in the form of an array, where each cell computes an output state as a function of its inputs and a computational rule set. In a one-dimensional cellular automaton of radius 1, a cell in the network computes its output state based upon inputs of itself and the two nearest cells along a single one-dimensional line. All cells in the array are updated simultaneously, and the updated value of the cell at the next time step is a function of the inputs from the previous time step. FIG. 9 illustrates a plot 900 of a Rule 30 update function, where a white cell represents that the cell value is equal to "0" and a black cell represents that the cell value is equal to "1." The output state of the cell is provided at the bottom as a function of the configuration of input cells.

For example, reviewing the first section 902 of the plot 900, if the cell has a value of "1" and each of its neighbors also has a value of "1," then the updated value of the cell would be "0." Since there are three inputs, each having possible values of "0" and "1," there are 2^3 or 8 possible input configurations. The update function or "rule" defines the output states that occur in the presence of each possible input configuration. The rule numbering system is defined as the base 10 number represented by the binary output string above −00022220=30.

Figure 8:
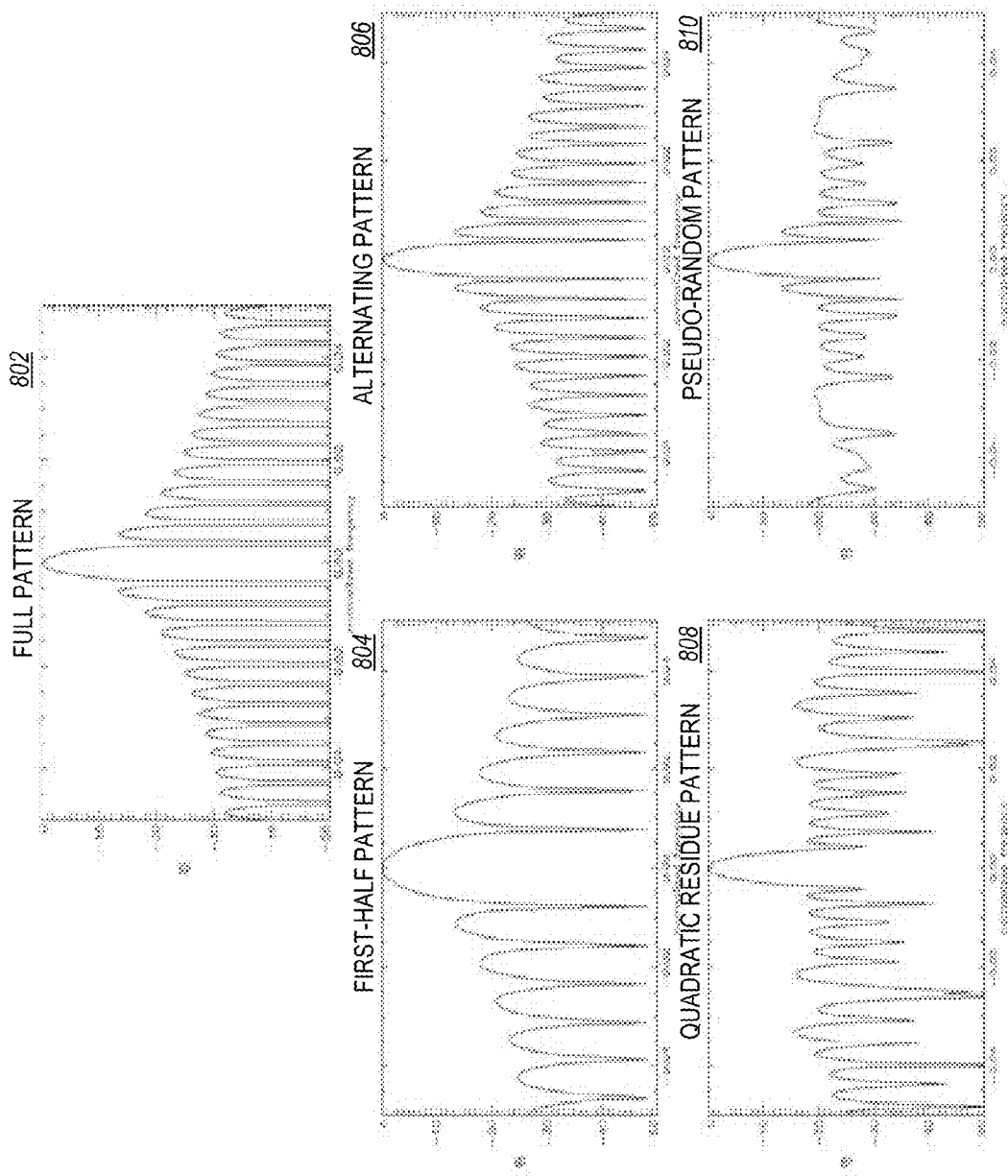
FIG. 8 contains a comparison of zoomed plots (showing the details of the main lobe) of frequency responses for the various sampling patterns of FIG. 7.
Figure 10:
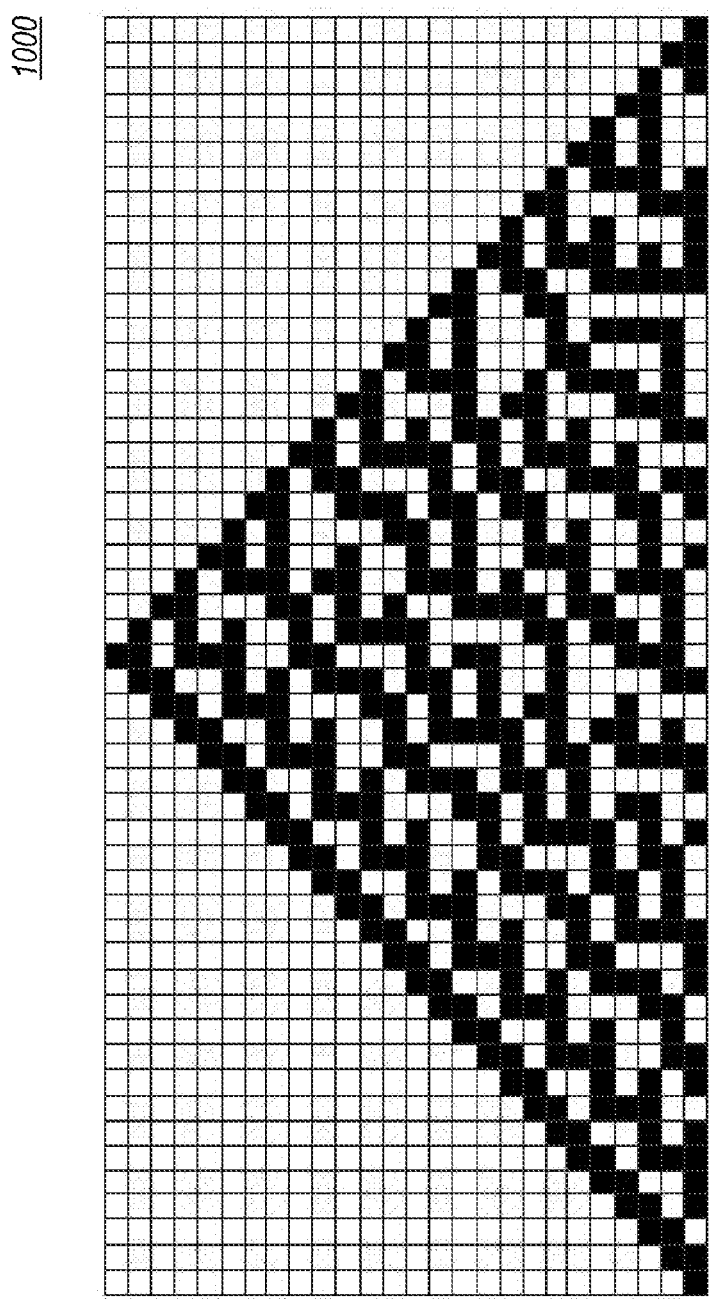
FIG. 10 illustrates a 50 step update of the Rule 30 cellular automaton of FIG. 9.

Time evolution of the Rule 30 cellular automata network yields interesting random properties which can be used to generate pseudo-random numbers having beneficial URW properties. FIG. 10 illustrates a 50 cell array 1000 with a time evolution of 25 updates using Rule 30 cellular automaton. The random number sequence used for URW sampling is taken from the center column of this evolution. The frequency plots of the Rule 30 patterns of length 257 are shown in FIGS. 8 and 7.

Figure 11:
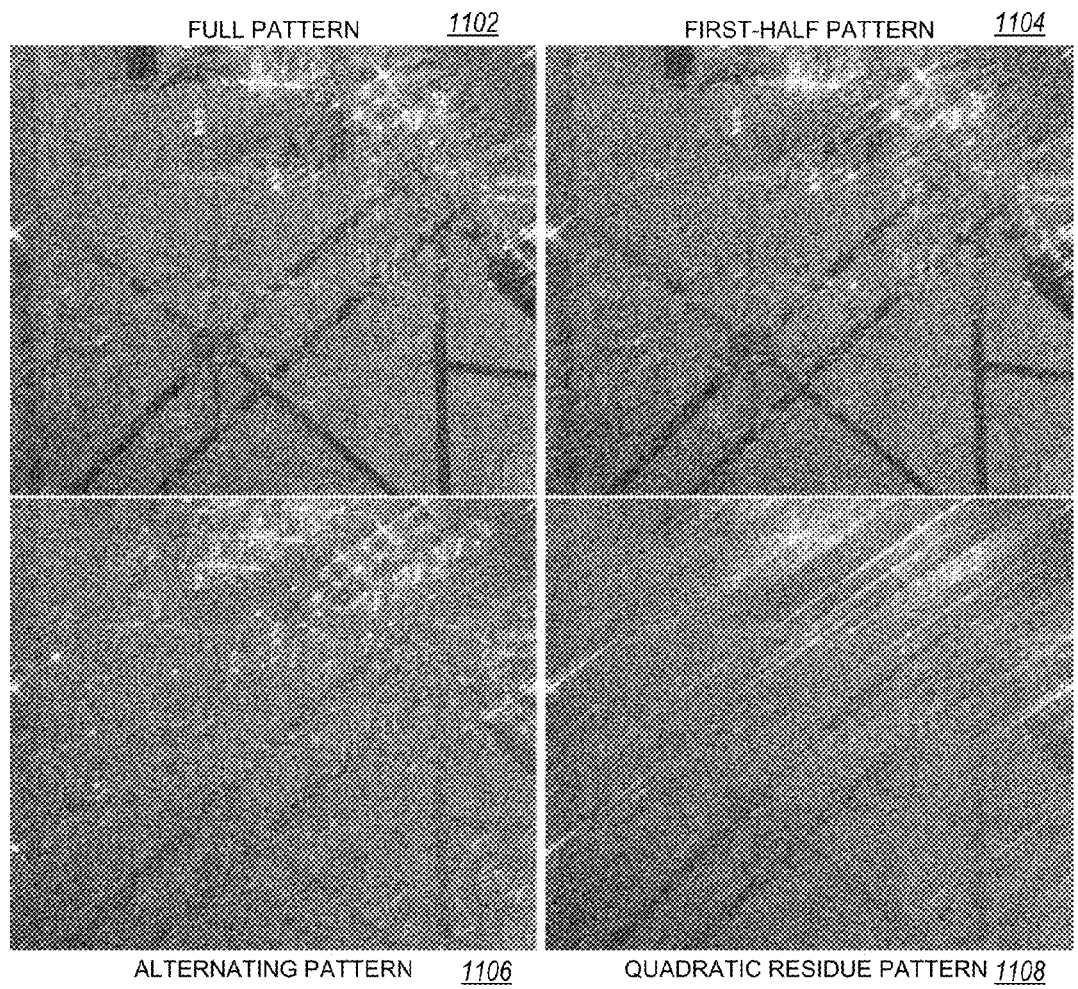
FIG. 11 contains a comparison of synthetic aperture radar (SAR) images obtained using various subaperture sampling patterns of length 41, including full pattern, first-half pattern alternating pattern, and quadratic residue pattern.

The goal of achieving high quality radar output data (e.g., for high resolution SAR images) using fewer radar pulses requires a number of signal processing advancements. Consider first the case of halving the number of radar pulses (which would allow for simultaneous imaging of two disparate areas, for example). FIG. 11 illustrates SAR images obtained using 32 pulses per subaperture, with subaperture sampling patterns of length 41 including a full pattern (image 1102), a first-half pattern (image 1104), an alternating pattern (image 1106) and a QR pattern (image 1108). The final three images (1104, 1106, 1108) are generated using approximately one-half of the pulses used for first image (1102).

A number of non-ideal solutions to the problem will be described herein and shown with phase history data in FIG. 11 to describe the motivation behind URW and illustrate certain improvements achieved by the inventions disclosed herein. The test data being used comes from an image that has two corner reflectors (at the left edge and the upper right portion of the image) in addition to a few other bright reflectors, as well as some low cross-section road-like or runway-like features.

One approach to generate SAR imagery with half the number of radar pulses would be to reduce the dwelling of the radar platform over the target by a factor of two. Because, in this case, the image resolution is proportional to the temporal aperture used for coherent integration, the image will have a coarser resolution (by the same factor of two). In addition, the sidelobe peaks are visible in that image and the low cross-section targets are slightly less well resolved.

One possible alternative is to use alternating pulses—spread the pulses out evenly over the same temporal aperture. Unfortunately, this pattern has a frequency response that has a large secondary peak near Nyquist frequency. This indicates that strong scatterers from frequencies near the Nyquist frequency will also be seen at zero frequency, which will create ghost images of the same corner reflector in the respective SAR image. The large sidelobes of the alternating pattern frequency response also almost completely blur the low cross-section features.

Unfortunately, as illustrated in FIG. 11, the image quality achieved using a QR pattern of length 41 is poor because the low difference in levels of the sidelobes relative to the main lobe (also referred to as the dynamic range of the sampling pattern) blurs both the high and low cross-section targets in the image. Using any of these sampling patterns inside each of subapertures (instead of uneven sampling on the subaperture level) will have deleterious effects on image quality as predicted by the frequency responses of those patterns.

Figure 12:
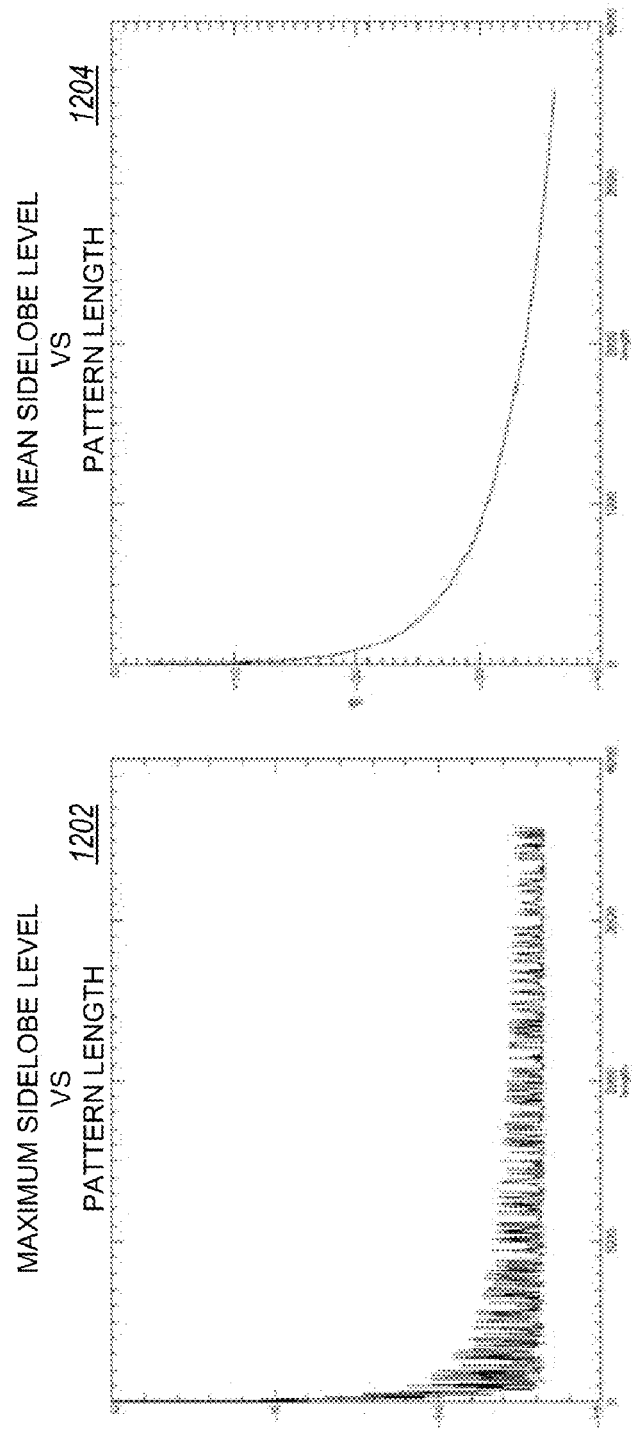
FIG. 12 contains a plot of a maximum sidelobe level of a QR pattern as a function of pattern length as compared to a plot of a mean sidelobe level.

There is little that can be done to improve the inherent sidelobe levels of a 50% sampling pattern, other than make the sidelobe pattern relatively flat and the main peak width as narrow as possible—the QR sampling pattern tends to achieve this best. Increasing the length of the QR pattern improves the sidelobes gradually, as seen in FIG. 12, illustrating a plot 1202 of the maximum sidelobe level of the QR pattern as a function of pattern length as well as a plot 1204 of mean sidelobe level as a function of pattern length. Changing the sampling or adding complex weights to the pattern does not significantly improve the pattern's effects on the generated SAR imagery. However, in accordance to one approach, a correction algorithm can be applied to correct for the sampling pattern effects. This is described further herein.

To correct for the effects of a URW sampling pattern, known properties of the sampling pattern and their propagated effects are leveraged in the decoding process. For example, the QR pattern (and the pseudo-random pattern) is known to have a narrow main lobe, which implies that what is observed in the Doppler spectrum at a particular frequency is predominately the result of energy at that frequency and little energy for other frequencies. This provides a level of confidence that strong scatterers in a SAR image constructed with a QR pattern will be well resolved and will not be significantly corrupted from energy elsewhere in the image.

Figure 13:
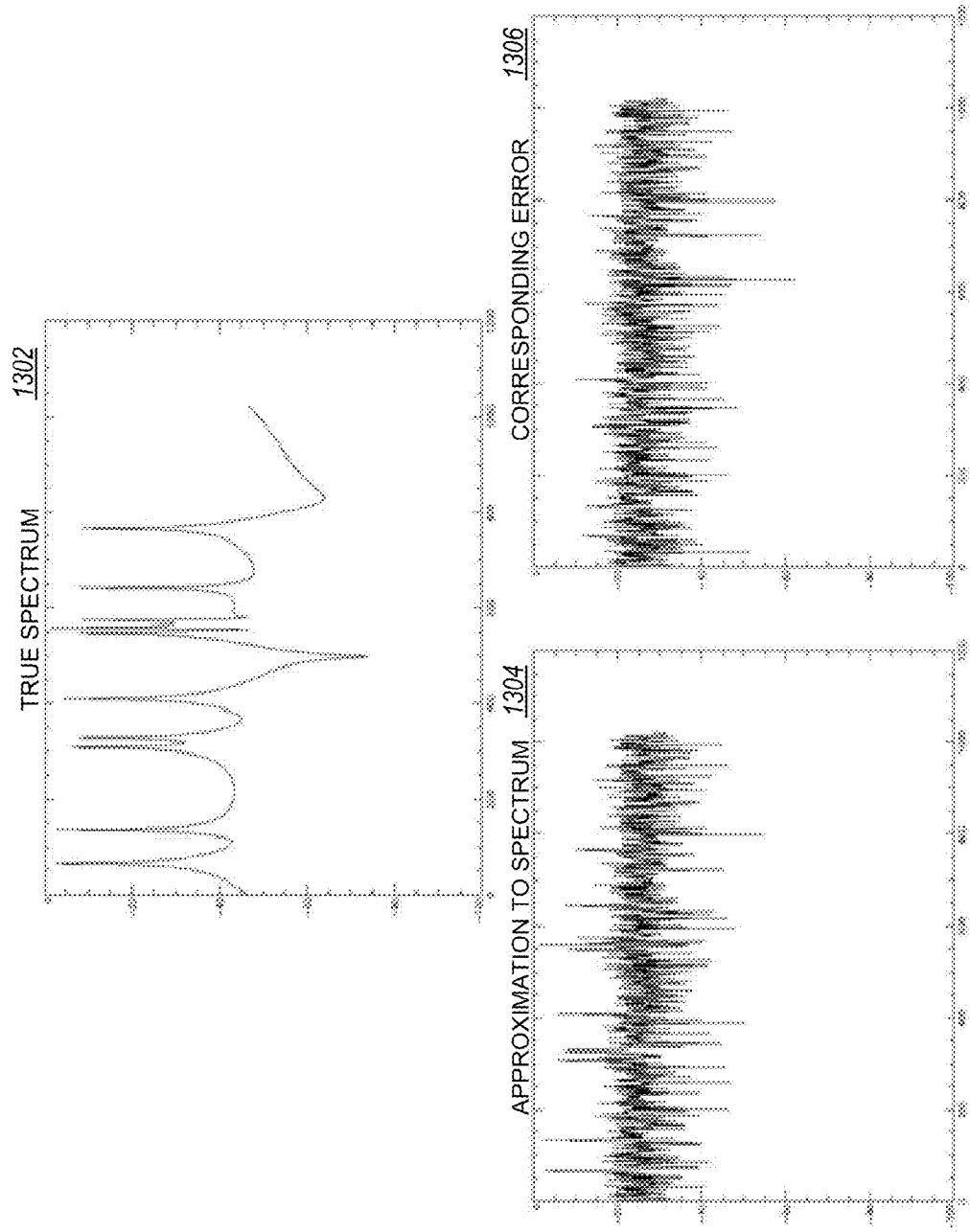
FIG. 13 contains a comparison of plots of true spectrum of a test data, approximation to the true spectrum, and corresponding error of the approximation to the true spectrum.

Using this fact, a reasonable confidence level is reached as to how the energy of this complex scatterer will propagate through the SAR imaging process via the sampling pattern response. Those skilled in the art will recognize propagation patterns and effects of other sampling patterns. In any event, iterative correction for complex scatterers may be used to remove the blurring effects observed in previous figures and resulting in a SAR image with better quality. To illustrate the motivation behind this process, first consider an example of approximating a spectrum consisting of ten discrete delta functions, whose periodogram is shown in FIG. 13, illustrating a true spectrum of test data (plot 1302), an approximation to the true spectrum when sampled using length 1021 QR pattern (plot 1304), and the corresponding error (plot 1306). When a representative time series is sampled unevenly, like the QR whose frequency response is shown in plot 1304, the resulting periodogram straightforwardly constructed from half of the time measurements is far inferior. Without additional processing, much of the true spectral energy is spread into other frequencies.

Still, each of the ten peaks can be discerned in the length 1021 QR spectral approximation, because they are visible within the dynamic range limitations of the sampling pattern. Taking into account the sampling effects, iterating over individual peaks or groups of peaks that are detected above a predetermined threshold related to the sampling pattern dynamic range, a much better approximation to the spectrum can be obtained.

Figure 14:
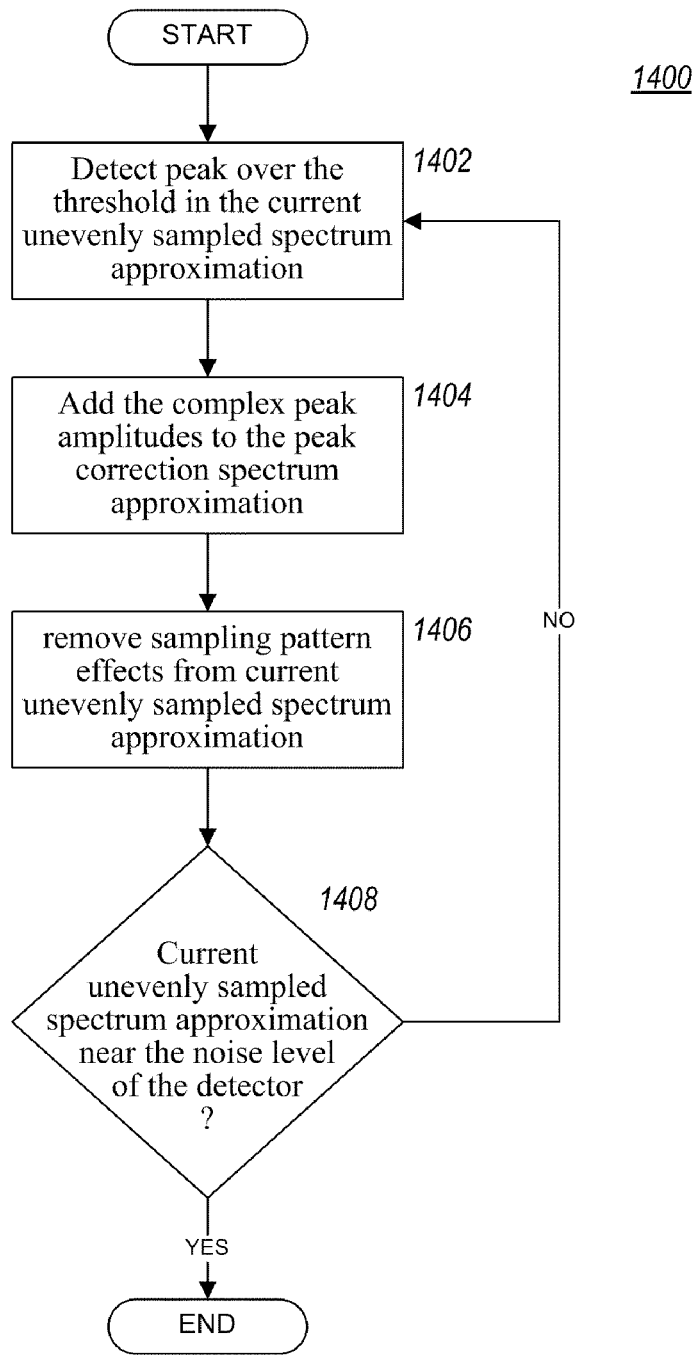
FIG. 14 is a flow diagram illustrating a peak correction process.
Figure 15:
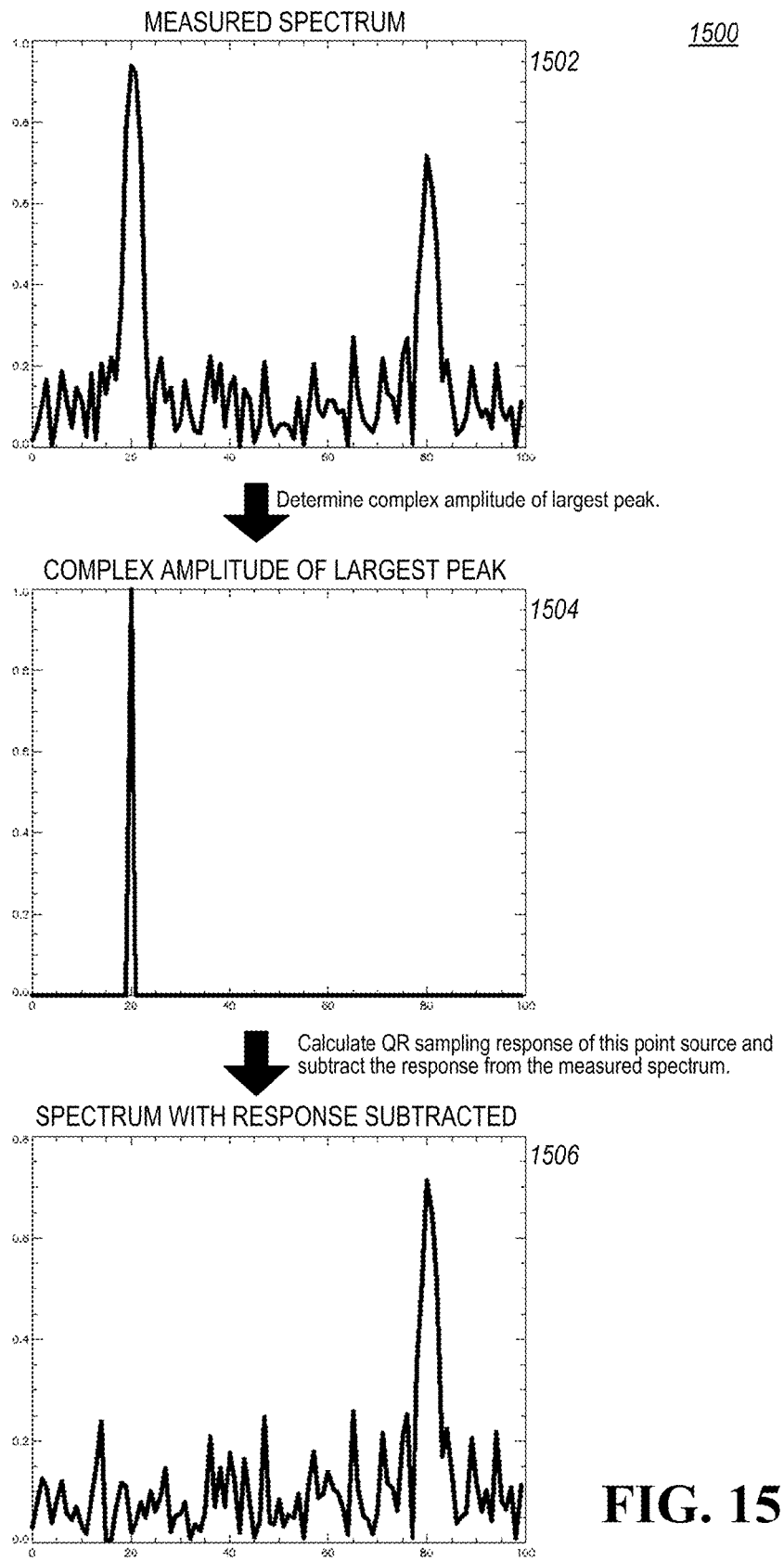
FIG. 15 is a compilation of plots illustrating the operation of the peak correction process of FIG. 14.

FIG. 14 illustrates an overview of a peak correction process 1400 that sets a threshold as appropriate to the uneven sampling pattern, and then iteratively processes the peaks in the sampling pattern. The description of the peak correction process 1400 will also refer to FIG. 15, which contains a plot of a measured spectrum 1502. In step 1402, a peak over the threshold in the current unevenly sampled spectrum approximation is detected. In one approach, this is the complex amplitude of the largest peak, as shown in 1504. In step 1404, the complex peak amplitude of the detected peak is added to the peak correction spectrum approximation. In step 1406, any sampling pattern effects due to the detected peak are removed from the current unevenly sampled spectrum approximation. In one approach, a QR sampling response of the point source 1504 is calculated and subtracted from the measured spectrum 1502, generating a resulting spectrum 1506 with the QR sampling response subtracted. Then, as determined in step 1408, the process stops when the current unevenly sampled spectrum approximation is near the noise level of the detector. This peak correction process 1400 is stable, so an over-aggressive stopping condition has little effect, on the spectral approximation.

Figure 16:
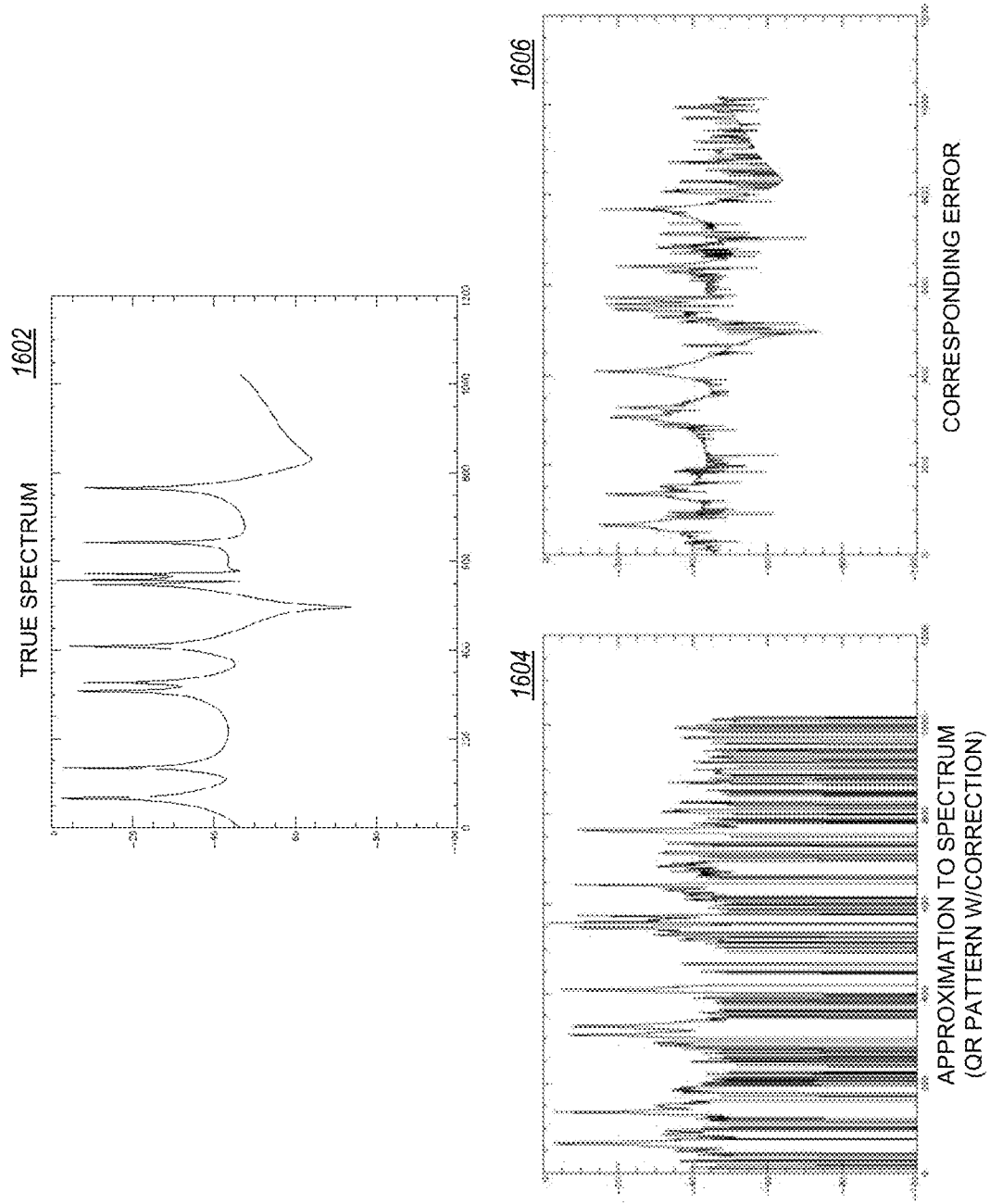
FIG. 16 is a plot of an approximation to the true spectrum as shown in FIG. 13 when sampled using QR pattern with the peak correction process of FIG. 14.

FIG. 16 contains a plot of an approximation of a test spectrum (plot 1602) when sampled using a QR pattern after the peak correction process 1400 has been applied (plot 1604). FIG. 16 also contains a plot of the corresponding error (plot 1606). As illustrated in plot 1604, this approximation detects all ten of the actual peaks in the data. The difference between plot 1604 and plot 1304 of FIG. 13, which is a plot of the approximation to the true spectrum when sampled using length 1021 QR pattern, is visually apparent. An interesting characteristic of the peak correction process 1400 is that it generally performs better with strong peaks, therefore its application to SAR imaging will improve most near strong features that are likely to be of interest.

Figure 17:
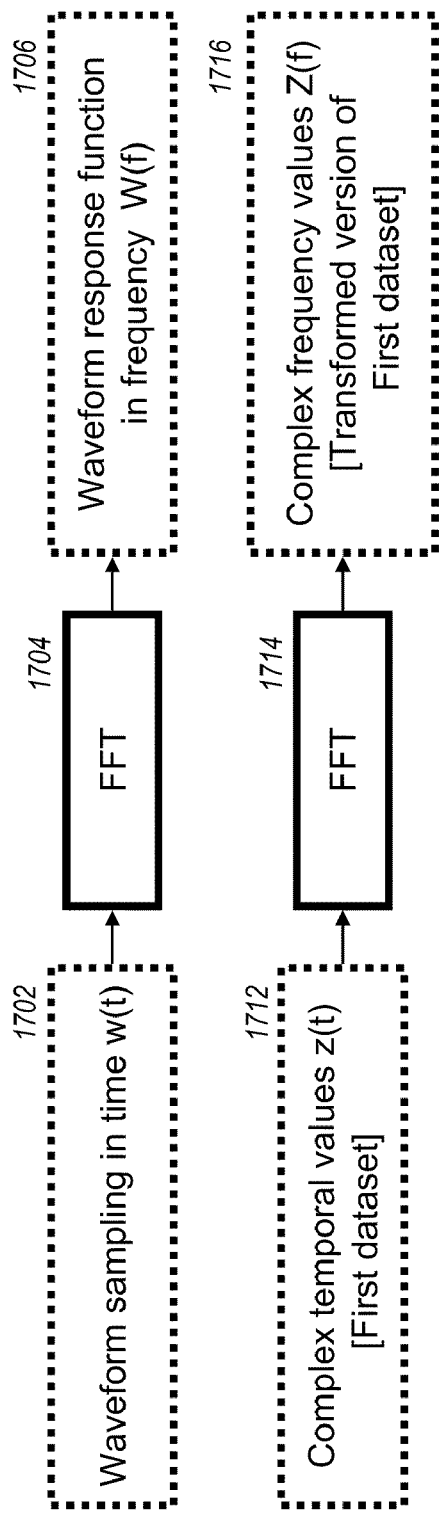
FIG. 17 is a block diagram illustrating a pair of transformations used to provide input data to an iterative process of the peak correction process of FIG. 14.
Figure 18:
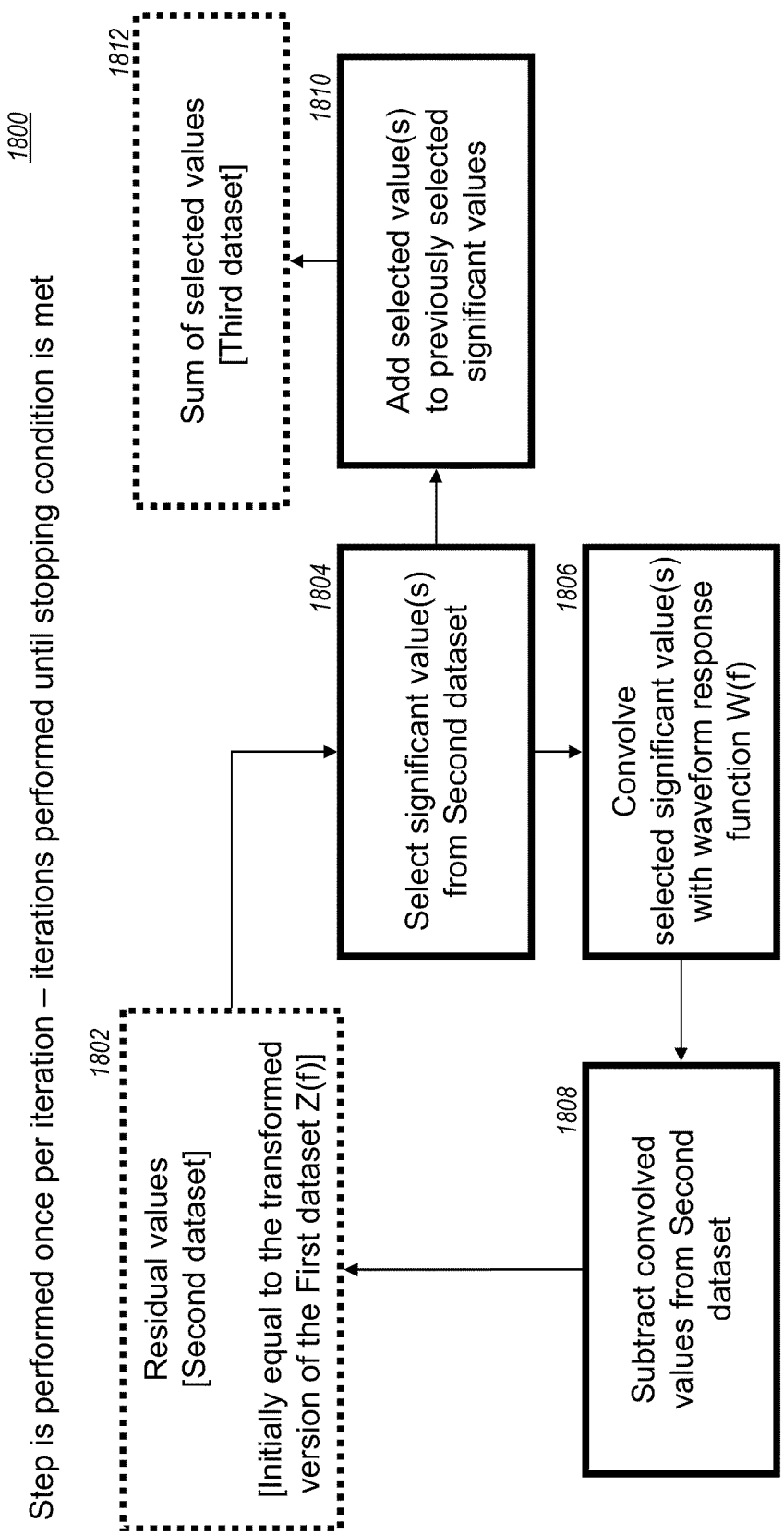
FIG. 18 is a block diagram detailing the iterative process of the peak correction process of FIG. 14.

FIG. 17 illustrates the setup for the peak correction process 1400, with an FFT block 1704 converting a waveform sampling w(t) in the time domain 1702 into a waveform response function W(f) in the frequency domain 1706, and an FFT block 1714 converting a set of received complex temporal data (a first dataset) z(t) in the time domain 1712 to a set of complex frequency data (a transformed version of the first dataset) Z(f) in the frequency domain 1716. The process then proceeds with FIG. 18, where a second dataset 1802, which is initially equal to the transformed version of the first dataset z(f) 1716, is processed by step 1804 such that at least one significant value from the second data set is selected. The second data set 1802 will also be referred to as a residual dataset. Then, operation continues with step 1806, where the at least one selected significant value is convolved with the waveform response function W(f) 1706, the result of which is subtracted from the second data set in step 1808. Further, a third dataset 1812 is created from step 1810, where the at least one selected value in step 1804 is added to previously selected significant values. Thus, the third dataset 1812 contains a sum of selected values.

Figure 19:
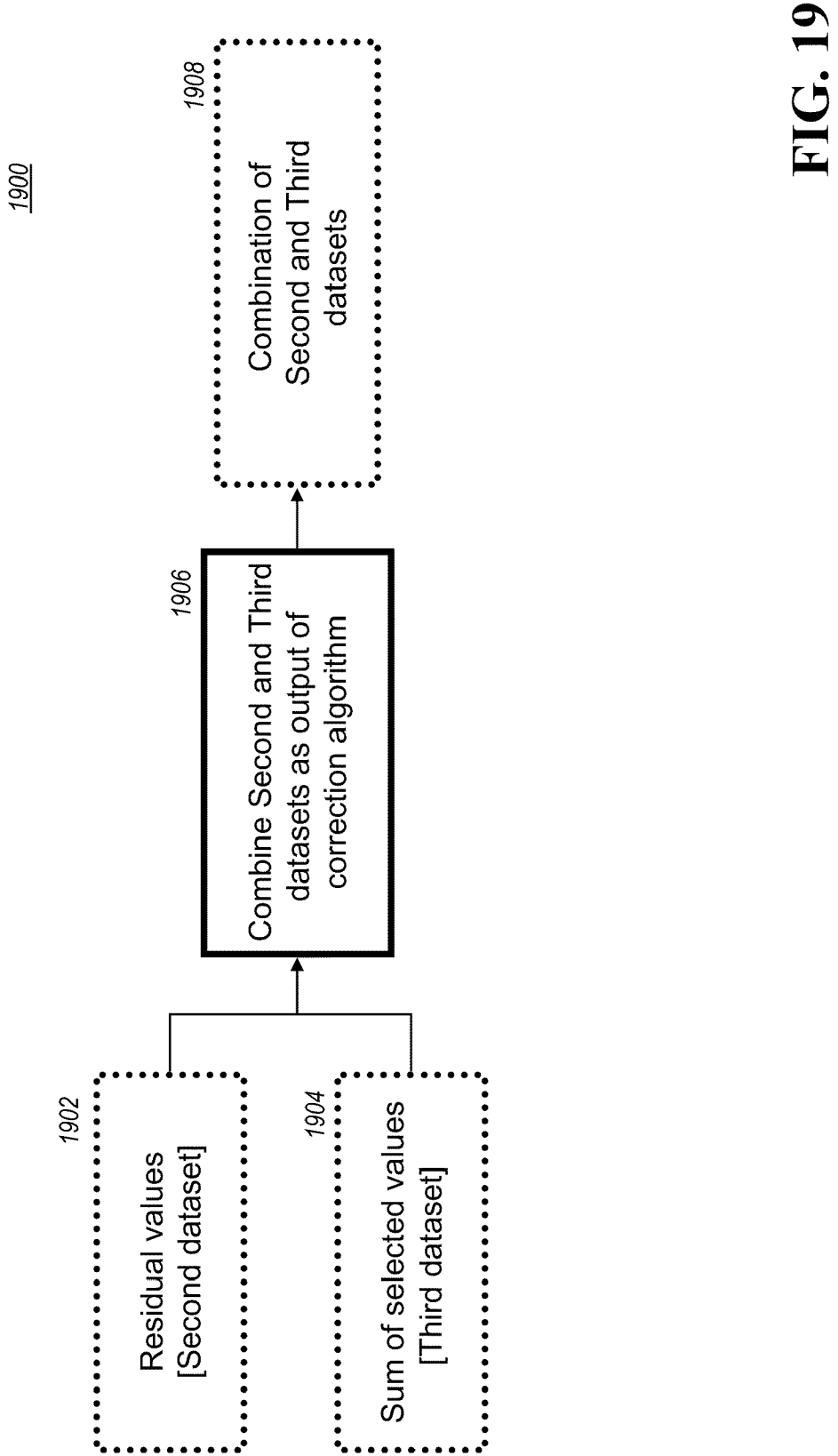
FIG. 19 is a block diagram illustrating the final step of the peak correction process.

FIG. 19 is a block diagram detailing an optional final step of the peak correction process 1400, where a final version of the second data set 1902 is added to a final version of the third dataset 1904 in block 1906 to create a combined dataset 1908. In various approaches, the term "combine" is used to describe generally what may be done with the residual dataset of second dataset 1802. For example, the residual dataset may be added back in with a multiplicative weight of one, while a multiplicative weight of zero would mean that it is effectively the same as not adding it back in. Other values may be used for the multiplicative weight.

Another way to describe the peak correction process is as follows.

Let $z(r,t)$ represent the values of complex radar pulses at range r and time t. Range samples r are separated in range by $\Delta r$ represented by the bandwidth of the radar, and time samples t are separated in time by $\Delta t$, represented by the PRF of the radar.

For standard SAR imaging, the waveform that is used is a fully-filled temporal aperture. Therefore, over the time period of $N*\Delta t$, where N is the number of pulses that can be collected in this time period with a given PRF, the URW representation is $w(t)=1$ for all t (i.e., a fully-filled temporal aperture), so the data used to generate images would be $z(r,t)*w(t)=z(r,t)$.

In cases where the URW is not unity for all t (i.e., the URW is not fully filled), a correction is made for the effects of the URW sampling in preparation for image generation. The effect of the waveform sampling is iteratively corrected as follows:

Let $Z(r,f)=FFT(z(r,t)*w(t))$ (e.g., Z(t) 1716), where FFT is the fast Fourier transform of the sampled complex radar data for range r over a temporal subaperture period less than or equal to the full temporal aperture. The center time of the temporal subaperture is denoted by ts.

Iteratively, for data $Z(r,f)$ at each range r, the following correction is performed:

For iteration k, a maximum magnitude of $Z(r,f,k)$ is identified, denoted as $Z_0(k)$.

In a first part of step 1804, a threshold is selected to be a magnitude that is less than or equal to $Z_0(k)$, denoted by $Z_T(k)$.

In a second part of step 1804, an array is formed $Z'(r,f,k)$ such that:

$Z'(r,f,k)=Z(r,f,k)$ if $|Z(r,f,k)|\geq Z_T(k)$ $Z'(r,f,k)=0$ if $|Z(r,f,k)|<Z_T(k)$ In step 1806, a correction filter is created by convolving the frequency response of the sampling filter by the array $Z'(r,f,k)$ such that $Z''(r,f,k)=Z'(r,f,k)\circ W(f)$ where $W(f)=FFT(w(t))$.

In step 1808, the data is then corrected using the following approach:

$Z(r,f,k+1)=Z(r,f,k)-Z''(r,f,k)$.

This iterative correction is performed until a satisfaction criterion or stopping condition is achieved. Useful stopping conditions include, but are not limited to, the following: 1) when a pre-defined number of iterations has been completed, 2) when the norm of the iterative correction is below a pre-defined threshold, 3) when the ratio between the largest peak in the residual to the mean of the residual noise level is below a pre-defined threshold, or 4) when the ratio between the norm of the residual to the norm of the original measurement is below a pre-defined threshold.

Utilizing the relationships between the sensor's attitude and state vector and the location of the area to be imaged, mapping relationships are constructed between the subaperture frame of reference (range r, frequency f, and time t, at which the subaperture is collected) and the ground plane (Cartesian positions x and y for the subaperture time $t_s$).

Temporal subapertures of $n*\Delta t$ in length (sampled with the appropriate URW sampling w(t)) are used (referenced to a subaperture time $t_s$)

$z(r,t,ts)*w(t)$ sampled as defined by the URW sampling $w(t)$.

For each range r, $Z(r,f,t_s)$ is the URW corrected subaperture data:

1. $Z(x,y,t_s)=map(Z(r,f,t_s))$ where map is a mapping between (r,f) and (x,y) at subaperture time $t_s$.
2. Compute the complex image $Z(x,y)=sum(Z(x,y,t_s))$ where sum is linear sum over subaperture time $t_s$.

While $Z(x,y)$ is the resulting complex valued image, $|Z(x,y)|^2|$ is used for the resultant detected image—for $w(t)=1$ for all t within each subaperture, this would be a standard SAR image.

Figure 20:
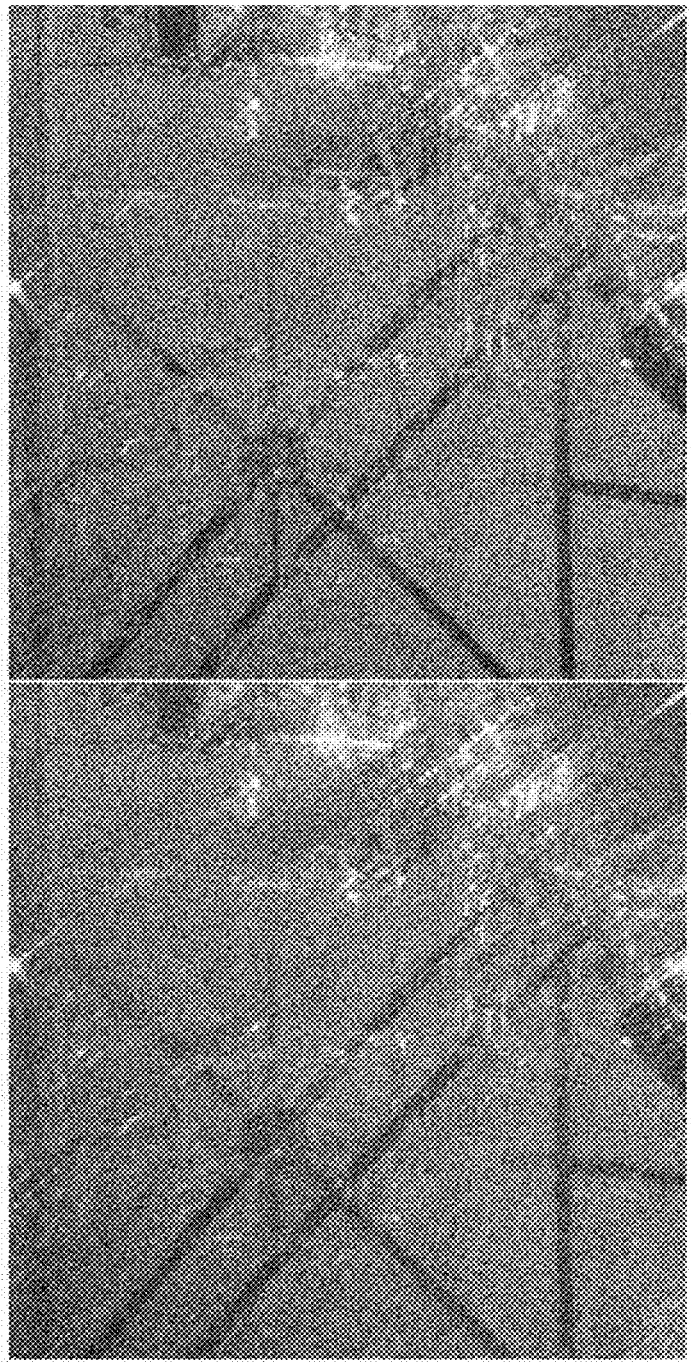
FIG. 20 illustrates a comparison between an SAR image captured using a full set of pulses, as well as a second SAR image obtained SAR image obtained using a QR pattern with peak correction.

The effect of applying the QR sampling pattern coupled with the peak correction algorithm on SAR imaging is shown in FIG. 20. As can be seen, a similar quality image has been produced using approximately half of the radar pulses.

The critical benefit of these disclosed approaches is the ability to provide quality Doppler resolution (i.e., narrow main lobe width) while simultaneously being able to resolve these Doppler frequencies unambiguously (i.e., individual sidelobes being as low as possible). Those of skill in the art would understand that radar data collected with this waveform can be used to create many useful products other than SAR images. For example, moving target indication (MTI) and high resolution terrain information (HRT) are two very useful radar products. The waveform and the correction algorithms described herein allow the algorithms of these other radar products to take advantage of the fine Doppler resolution and large unambiguous Doppler frequencies that this invention can provide. The use of this waveform and the correction algorithms in conjunction with other radar algorithms should not be interpreted as causing a departure from the scope of the present invention.

Figure 21:
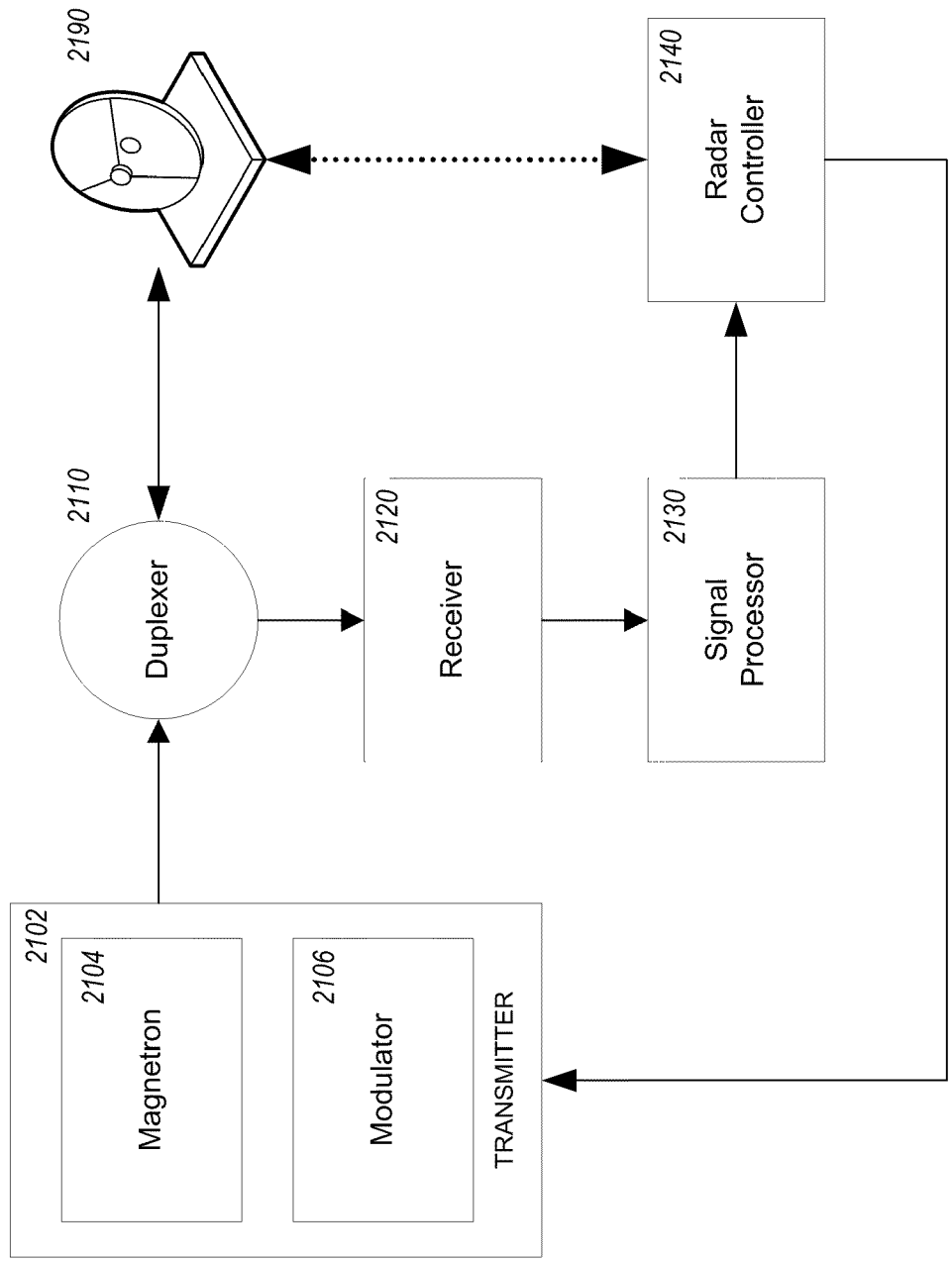
FIG. 21 is a block diagram of a radar system that may be used in the generation, transmission, and receipt of the URW.

FIG. 21 illustrates an exemplary radar system 2100 that may be used in the implementation of the URW, including a transmitter 2102, a duplexer 2110, a receiver 2120, a signal processor 2130, and a radar controller 2140. The transmitter 2102 is configured to generate a radio signal with an oscillator such as a klystron or a magnetron 2104, with the duration and sequence of pulses controlled by a modulator 2106. A waveguide (not shown) links the transmitter 2102 and the antenna 2190, with the duplexer 2110 serving as a switch between the antenna 2190 and the transmitter 2102 or the receiver 2120 for transmitting or receiving signals when the antenna is used in both situations. The received signals from the receiver 2120 are processed by the signal processor 2130 before being further analyzed by the radar controller 2140, which controls all the elements in radar system 2100 to perform radar scans using the URW as described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A processing system may include a processor and memory, as well as a combination of other components.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The hardware, including the ASIC, may reside in a radar platform. In the alternative, the processor and the storage medium may reside as discrete components in the radar platform.

The previous description of the disclosed embodiments is provided to enable any person skilled in the art to make or use the present invention. Various modifications to these embodiments will be readily apparent to those skilled in the art, and the generic principles defined herein nay be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing a waveform comprising:
   receiving a first data set having a plurality of values based on a radar waveform return from a set of transmitted radar pulses in which the time separation between at least two neighboring pulses is at least equal to twice the shortest time separation between all of the other neighboring pulses in the set; and
   creating a second data set comprising the first data set minus at least one significant value from the first data set and its effects on other values within the first data set.

2. The method of claim 1, further comprising:
   creating a third dataset comprising the at least one significant value from the first data set; and
   combining the second and third datasets.

3. The method of claim 1, wherein the first data set comprises a plurality of transformed values.

4. The method of claim 3, wherein the plurality of transformed values are frequency values.

5. The method of claim 1, wherein the significant values comprise peak values in a frequency domain.

6. The method of claim 1, wherein the plurality of values comprise an uneven sampling pattern.

7. The method of claim 1 wherein the second data set comprises a number of peak values from the first data set chosen based on a predetermined selection criteria.

8. The method of claim 7, wherein the predetermined selection criteria is a threshold.

9. The method of claim 1, further comprising determining the effects of the at least one significant value by calculating a plurality of propagated effects from the at least one significant value.

10. The method of claim 1 wherein the time separation between at least two neighboring pulses is at least equal to four times the shortest time separation between all of the other neighboring pulses in the set.

11. A computer-program product comprising:
    computer-readable storage medium comprising codes executable by at least one computer to implement a method for processing a waveform, comprising:
       code for receiving a first data set having a plurality of values based on a radar waveform return from a set of transmitted radar pulses in which the time separation between at least two neighboring pulses is at least equal to twice the shortest time separation between all of the other neighboring pulses in the set; and
       code for creating a second data set comprising the first data set minus at least one significant value from the first data set and its effects on other values within the first data set.

12. The computer-program product of claim 11, wherein the computer-readable medium further comprising:
    code for creating a third dataset comprising the at least one significant value from the first data set; and
    code for combining the second and third datasets.

13. The computer-program product of claim 11, wherein the first data set comprises a plurality of transformed values.

14. The computer-program product of claim 13, wherein the plurality of transformed values are frequency values.

15. The computer-program product of claim 11, wherein the significant values comprise peak values in a frequency domain.

16. The computer-program product of claim 11, wherein the plurality of values comprise an uneven sampling pattern.

17. The computer-program product of claim 11, wherein the second data set comprises a number of peak values from the first data set chosen based on a predetermined selection criteria.

18. The computer-program product of claim 17, wherein the predetermined selection criteria is a threshold.

19. The computer-program product of claim 11, wherein the computer-readable medium further comprising code for determining the effects of the at least one significant value by calculating a plurality of propagated effects from the at least one significant value.

20. The computer-program product of claim 11 wherein the time separation between at least two neighboring pulses is at least equal to four times the shortest time separation between all of the other neighboring pulses in the set.

21. A method for processing a waveform comprising:
receiving a first data set comprising a plurality of transformed values of a set of transmitted radar pulses in which the time separation between at least two neighboring pulses is at least equal to twice the shortest time separation between all of the other neighboring pulses in the set;
identifying at least one peak value in the first data set;
creating a peak correction function approximation using the at least one peak value; and,
removing the peak correction function approximation from the first data set. to create another data set.

22. The method of claim 21, further comprising creating the plurality of transformed values by:
receiving a plurality of samples of the waveform; and,
performing an FFT on the plurality of samples.

23. The method of claim 22, wherein the temporal relationship between at least three of the samples in the plurality of samples of the waveform is uneven.

24. The method of claim 22, wherein the waveform is represented by a full set of samples, and the plurality of samples contains only a subset of the full set of samples.

25. The method of claim 22, wherein performing the FFT comprises transforming the plurality of samples from a time domain to a frequency domain.

26. The method of claim 21, wherein creating the peak correction function approximation using the at least one peak value comprises creating a collection of peak values having the at least one peak value.

27. The method of claim 21, wherein creating the peak correction function approximation comprises determining any peak effects on the first data set based on the at least one peak value.

28. The method of claim 27, wherein determining any peak effects on the first data set based on the at least one peak value comprises creating a plurality of transformed samples using the at least one peak value.

29. The method of claim 21 wherein the time separation between at least two neighboring pulses is at least equal to four times the shortest time separation between all of the other neighboring pulses in the set.

30. A waveform generator for generating a plurality of pulses to be transmitted comprising:
a processing system configured to generate a binary sequence representing a transmission of pulses from a plurality of pulses, wherein the binary sequence comprises a sampling pattern of a fully transmitted stream of pulses comprising a first underlying pulse repetition frequency, the sampling pattern having a time separation between at least two neighboring pulses that is at least equal to twice the shortest time separation between all of the other neighboring pulses in the sampling pattern; and,
a transmitter coupled to the processing system, the transmitter configured to transmit a coded sequence of pulses based on the binary sequence.

31. The waveform generator of claim 30, where the coded sequence comprises a temporally coded sequence.

32. The waveform generator of claim 30, where the sampling pattern consists of a sampling pattern chosen from a quadratic residue (QR) pattern and a pseudo-random pattern.

33. The waveform generator of claim 30, where the sampling pattern comprises a second underlying pulse repetition frequency combined with the first underlying pulse repetition frequency.

34. The waveform generator of claim 30, wherein the coded sequence of pulses has a frequency response comprising a narrow main lobe and small sidelobes.

35. The waveform generator of claim 30 wherein the time separation between at least two neighboring pulses is at least equal to four times the shortest time separation between all of the other neighboring pulses in the set.

36. A method for generating a plurality of pulses to be transmitted comprising:
generating a binary sequence representing a transmission of pulses from a plurality of pulses, wherein the binary sequence comprises a sampling pattern of a fully transmitted stream of pulses comprising a first underlying pulse repetition frequency, the sampling pattern having a time separation between at least two neighboring pulses that is at least equal to twice the shortest time separation between all of the other neighboring pulses in the sampling pattern; and,
creating a coded sequence of pulses based on the binary sequence.

37. The method of claim 36, where the coded sequence comprises a temporally coded sequence.

38. The method of claim 36, where the sampling pattern consists of a sampling pattern chosen from a quadratic residue (QR) pattern, and a pseudo-random pattern.

39. The method of claim 36, where the sampling pattern comprises a second underlying pulse repetition frequency combined with the first underlying pulse repetition frequency.

40. The method of claim 36, wherein the coded sequence of pulses has a frequency response comprising a narrow main lobe and small sidelobes.

41. The method of claim 36 wherein the time separation between at least two neighboring pulses is at least equal to four times the shortest time separation between all of the other neighboring pulses in the set.

42. A method for generating, transmitting, receiving, and processing a plurality of pulses comprising:
generating a binary sequence representing a transmission of pulses from the plurality of pulses, wherein the binary sequence comprises a sampling pattern of a fully transmitted stream of pulses comprising a first underlying pulse repetition frequency, the sampling pattern having a time separation between at least two neighboring pulses that is at least equal to twice the shortest time separation between all of the other neighboring pulses in the sampling pattern;
creating a coded sequence of pulses based on the binary sequence;
transmitting the coded sequence of pulses;
receiving a scattering of the coded sequence of pulses;
receiving a first data set having a plurality of values based on the scattered coded sequence of pulses that are received; and
creating a second data set comprising the first data set minus at least one significant value from the first data set and its effects on other values within the first data set.

43. The method of claim 42 where the sampling pattern comprises a second underlying pulse repetition frequency combined with the first underlying pulse repetition frequency.

44. The method of claim 43 wherein the second data set comprises a number of peak values from the first data set chosen based on a predetermined selection criteria and wherein the predetermined selection criteria is a threshold.

45. The method of claim 42 wherein the time separation between at least two neighboring pulses is at least equal to four times the shortest time separation between all of the other neighboring pulses in the set.

46. A radar system comprising:
a processing system configured to generate a binary sequence representing a transmission of pulses from the plurality of pulses, wherein the binary sequence comprises a sampling pattern of a fully transmitted stream of pulses comprising a first underlying pulse repetition frequency, the sampling pattern having a time separation between at least two neighboring pulses that is at least equal to twice the shortest time separation between any of the other neighboring pulses in the sampling pattern;
a transmitter coupled to the processing system, the transmitter configured to transmit a coded sequence of pulses based on the binary sequence;
a receiver configured to receive a scattering of the transmitted coded sequence of pulses; and
a signal processor configured to process a first data set having a plurality of values based on the scattered coded sequence of pulses that are received and to create a second data set comprising the first data set minus at least one significant value from the first data set and its effects on other values within the first data set.

47. The radar system of claim 46 where the sampling pattern comprises a second underlying pulse repetition frequency combined with the first underlying pulse repetition frequency.

48. The radar system of claim 46 wherein the second data set comprises a number of peak values from the first data set chosen based on a predetermined selection criteria and wherein the predetermined selection criteria is a threshold.

49. The radar system of claim 46 wherein the time separation between at least two neighboring pulses is at least equal to four times the shortest time separation between all of the other neighboring pulses in the set.

* * * * *